US011101911B2

(12) United States Patent
Takeda et al.

(10) Patent No.: US 11,101,911 B2
(45) Date of Patent: Aug. 24, 2021

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 21 days.

(21) Appl. No.: 16/071,951

(22) PCT Filed: Jan. 25, 2017

(86) PCT No.: PCT/JP2017/002426
§ 371 (c)(1),
(2) Date: Jul. 23, 2018

(87) PCT Pub. No.: WO2017/130993
PCT Pub. Date: Aug. 3, 2017

(65) Prior Publication Data
US 2019/0081722 A1    Mar. 14, 2019

(30) Foreign Application Priority Data

Jan. 27, 2016    (JP) .............................. JP2016-013684

(51) Int. Cl.
*H04J 13/18*    (2011.01)
*H04W 72/04*    (2009.01)
(Continued)

(52) U.S. Cl.
CPC .............. *H04J 13/18* (2013.01); *H04B 1/713* (2013.01); *H04J 13/16* (2013.01); *H04L 5/0048* (2013.01);
(Continued)

(58) Field of Classification Search
None
See application file for complete search history.

(56) References Cited

U.S. PATENT DOCUMENTS

2010/0067591 A1* 3/2010 Luo ...................... H04L 1/0028
375/260
2012/0113962 A1* 5/2012 Jen ........................ H04L 5/0053
370/336

(Continued)

FOREIGN PATENT DOCUMENTS

CN    107925551 A    4/2018
EP      3346787 A1    7/2018

OTHER PUBLICATIONS

3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

(Continued)

*Primary Examiner* — Lonnie V Sweet
(74) *Attorney, Agent, or Firm* — Osha Bergman Watanabe & Burton LLP

(57) ABSTRACT

Communication is performed by using an uplink control channel of a configuration matching each shortened TTI. A user terminal according to the present invention includes: a transmission section that transmits uplink control information via an uplink control channel by using a shortened TTI configured by a smaller number of symbols than symbols of a normal TTI; and a control section that controls the transmission of the uplink control information, and the control section transmits the uplink control information by using a resource block subjected to frequency hopping between slots in the second TTI, and maps a demodulation reference signal on at least one symbol that configures the slots.

9 Claims, 24 Drawing Sheets

(51) Int. Cl.
*H04L 27/26* (2006.01)
*H04J 13/16* (2011.01)
*H04B 1/713* (2011.01)
*H04L 5/00* (2006.01)
*H04L 25/02* (2006.01)
*H04W 80/02* (2009.01)

(52) U.S. Cl.
CPC ............ *H04L 25/023* (2013.01); *H04L 27/26* (2013.01); *H04L 27/2607* (2013.01); *H04W 72/04* (2013.01); *H04W 72/0406* (2013.01); *H04W 72/0446* (2013.01); *H04W 72/0453* (2013.01); *H04J 2013/165* (2013.01); *H04L 5/0012* (2013.01); *H04W 80/02* (2013.01)

(56) References Cited

U.S. PATENT DOCUMENTS

| | | | |
|---|---|---|---|
| 2013/0148592 A1* | 6/2013 | Noh ...................... | H04W 72/12 370/329 |
| 2014/0226607 A1 | 8/2014 | Holma et al. | |
| 2016/0192388 A1* | 6/2016 | Ekpenyong ........... | H04L 1/1829 370/329 |
| 2018/0007529 A1* | 1/2018 | Shin ........................ | H04J 11/00 |
| 2018/0098337 A1* | 4/2018 | Lee .................. | H04W 72/1278 |
| 2018/0255543 A1 | 9/2018 | Takeda et al. | |
| 2020/0228289 A1* | 7/2020 | He ....................... | H04L 5/0064 |

OTHER PUBLICATIONS

International Search Report issued in PCT/JP2017/002426 dated Apr. 11, 2017 (1 page).
Written Opinion issued in PCT/JP2017/002426 dated Apr. 11, 2017 (3 pages).
Extended European Search Report issued in European Application No. 17744223.3, dated Aug. 26, 2019 (8 pages).
Office Action issued in the counterpart Chinese Patent Application No. 201780008930.3, dated Sep. 24, 2020 (18 pages).
Office Action issued in European Application No. 17744223.3, dated Mar. 24, 2021 (6 pages).

* cited by examiner

DL/UL

DL-SHORTENED TTI
DL-NORMAL TTI
UL-NORMAL TTI

TD-LTE

PUCCH format 1/1a/1b

PUCCH format 2/2a/2b/3

PUCCH format 4

PUCCH format 5

4 INFORMATION SYMBOLS => PHASE ROTATION (SEQUENCE LENGTH 12) + ORTHOGONAL SPREADING CODE (SEQUENCE LENGTH 4)

3 DMRS SYMBOLS => PHASE ROTATION (SEQUENCE LENGTH 12) + ORTHOGONAL SPREADING CODE (SEQUENCE LENGTH 3)

5 INFORMATION SYMBOLS => ORTHOGONAL SPREADING CODE (SEQUENCE LENGTH 5)

2 DMRS SYMBOLS => PHASE ROTATION (SEQUENCE LENGTH 12)

2 INFORMATION SYMBOLS => PHASE ROTATION (SEQUENCE LENGTH 12) + ORTHOGONAL SPREADING CODE (SEQUENCE LENGTH 2)

2 DMRS SYMBOLS => PHASE ROTATION (SEQUENCE LENGTH 12) + ORTHOGONAL SPREADING CODE (SEQUENCE LENGTH 2)

3 INFORMATION SYMBOLS => PHASE ROTATION (SEQUENCE LENGTH 12) + ORTHOGONAL SPREADING CODE (SEQUENCE LENGTH 3)

1 DMRS SYMBOL => PHASE ROTATION (SEQUENCE LENGTH 12)

3 INFORMATION SYMBOLS => DIFFERENT BITS + PHASE ROTATION (SEQUENCE LENGTH 12)
1 DMRS SYMBOL => PHASE ROTATION (SEQUENCE LENGTH 12)

3 INFORMATION SYMBOLS => DIFFERENT BITS, SPREADING IS NOT APPLIED

3 INFORMATION SYMBOLS => DIFFERENT BITS + PHASE ROTATION (SEQUENCE LENGTH 12)
1 DMRS SYMBOL => PHASE ROTATION (SEQUENCE LENGTH 12)

USER TERMINAL, RADIO BASE STATION, AND RADIO COMMUNICATION METHOD

TECHNICAL FIELD

The present invention relates to a user terminal, a radio base station, and a radio communication method of a next-generation communication system.

BACKGROUND ART

In UMTS (Universal Mobile Telecommunications System) networks, for purposes of higher data rates, lower delay and the like, Long Term Evolution (LTE) has been specified (Non-Patent Document 1). Further, for purposes of wider bands and higher speed than LTE (also referred to as LTE Rel.8 or 9), LTE-A (also referred to as LTE Advanced or LTE Rel.10, 11 or 12) has been specified, and a successor system of LTE (also referred to as, for example, FRA (Future Radio Access), 5G (5th generation mobile communication system), or LTE Rel.14) has also been studied.

According to LTE Rel.10/11, for a purpose of a wider band, Carrier Aggregation (CA) of integrating a plurality of Component Carriers (CCs) has been introduced. Each CC is configured by a system band according to LTE Rel. 8 as one unit. Further, according to the CA, a plurality of CCs of an identical radio base station (eNB: eNodeB) is configured to a user terminal (UE: User Equipment).

Meanwhile, according to LTE Rel.12, Dual Connectivity (DC) of configuring a plurality of Cell Groups (CG) of different radio base stations to a UE has also been introduced. Each cell group is configured by at least one cell (CC). The DC integrates a plurality of CCs of the different radio base stations, and therefore is also referred to as Inter-eNB CA.

Further, according to LTE Rel.8 to 12, Frequency Division Duplex (FDD) of performing Downlink (DL) transmission and Uplink (UL) transmission at different frequency bands, and Time Division Duplex (TDD) of temporarily switching DL transmission and UL transmission at the same frequency band have been introduced.

According to above LTE Rel. 8 to 12, a Transmission Time Interval (TTI) applied to DL transmission and UL transmission between a radio base station and a user terminal is configured to 1 ms and is controlled. The TTI in LTE systems (e.g. LTE Rel.8 to 13) is referred to as a subframe and a subframe length, too.

CITATION LIST

Non-Patent Literature

[Non-Patent Literature 1] 3GPP TS 36.300 "Evolved UTRA and Evolved UTRAN Overall description"

SUMMARY OF INVENTION

Technical Problem

Meanwhile, future radio communication systems such as LTE subsequent to Rel.13 and 5G are assumed to perform communication at a high frequency band such as several tens of GHz, and perform communication such as IoT (Internet of Things), MTC: Machine Type Communication and M2M (Machine To Machine) whose data amounts are relatively small. When a communication method (e.g. a Transmission Time Interval (TTI) is 1 ms) of existing LTE systems (e.g. LTE Rel.8 to 12) is applied to such future radio communication systems, there is a concern that it is not possible to provide sufficient communication service.

Hence, the future radio communication systems are assumed to perform communication by using shorter TTIs (referred to as shortened TTIs) than TTIs of 1 ms (referred to as normal TTIs). When each shortened TTI is used, what matters is how to configure an uplink control channel (PUCCH: Physical Uplink Control Channel) transmitted by using each shortened TTI.

The present invention has been made in view of such a respect, and one of objects of the present invention is to provide a user terminal, a radio base station, and a radio communication method that can perform communication by using an uplink control channel of a configuration matching each shortened TTI.

One aspect of a user terminal according to the present invention includes: a transmission section that transmits uplink control information via an uplink control channel by using a second Transmission Time Interval (TTI) configured by a smaller number of symbols than symbols of a first TTI; and a control section that controls the transmission of the uplink control information, and the control section transmits the uplink control information by using a resource block subjected to frequency hopping between slots in the second TTI, and maps a demodulation reference signal on at least one symbol that configures the slots.

According to the present invention, it is possible to perform communication by using an uplink control channel of a configuration matching each shortened TTI.

DESCRIPTION OF EMBODIMENTS

Figure 1:
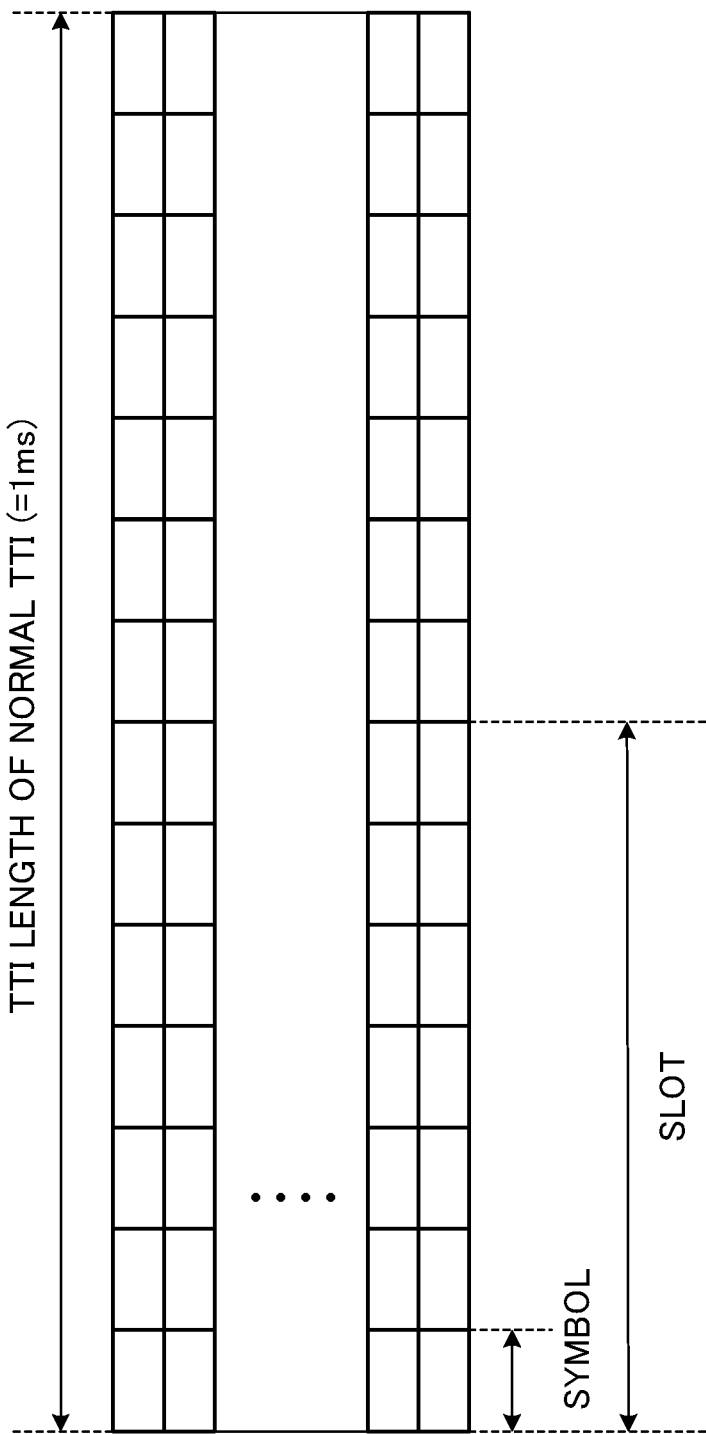
FIG. 1 is a diagram illustrating an arrangement example of a normal TTI.

FIG. 1 is a diagram illustrating an example of a TTI (normal TTI) in LTE systems (e.g. LTE Rel.8 to 12). As illustrated in FIG. 1, the normal TTI has a time length (duration) of 1 ms. The normal TTI is referred to as a subframe, too, and is configured by two time slots (also referred to as normal slots to distinguish from slots in a shortened TTI). In this regard, in the LTE system, the normal TTI is a transmission time unit of one data/packet subjected to channel coding, and is a processing time such as scheduling and link adaptation.

As illustrated in FIG. 1, in a case of normal Cyclic Prefix (CP) on downlink (DL), the normal TTI is configured to include 14 OFDM (Orthogonal Frequency Division Multiplexing) symbols (7 OFDM symbols per normal slot). Each OFDM symbol has a time length (symbol length) of 66.7 μs and is added with normal CP of 4.76 μs. A symbol length and a subcarrier interval have a relationship of a reciprocal, and therefore the subcarrier interval is 15 kHz when the symbol length is 66.7 μs.

Further, in a case of normal Cyclic Prefix (CP) on uplink (UL), the normal TTI is configured to include 14 SC-FDMA (Single Carrier Frequency Division Multiple Access) symbols (7 SC-FDMA symbols per normal slot). Each SC-FDMA symbol has a time length (symbol length) of 66.7 μs and is added with normal CP of 4.76 μs. A symbol length and a subcarrier interval have a relationship of a reciprocal, and therefore the subcarrier interval is 15 kHz when the symbol length is 66.7 μs.

In this regard, although not illustrated, in a case of enhanced CP, the normal TTI may be configured to include 12 OFDM symbols (or 12 SC-FDMA symbols). In this case, each OFDM symbol (or each SC-FDMA symbol) has a time length of 66.7 μs, and is added with enhanced CP of 16.67 μs. Further, OFDM symbols may be used for UL. OFDM symbols and SC-FDMA symbols will be referred to as "symbols" unless distinguished below.

Meanwhile, for future radio communication systems such as LTE subsequent to Rel.14 and 5G, a radio interface suitable to a high frequency band such as several tens of GHz, and a radio interface whose packet size is small yet which minimizes delay to match communication such as IoT (Internet of Things), MTC: Machine Type Communication and M2M (Machine To Machine) whose data amounts are relatively small are desired.

When a shortened TTI of a shorter time length (duration) than that of the normal TTI is used, a time margin for processing (such as encoding and decoding) in a user terminal and a radio base station increases, so that it is possible to reduce processing delay. Further, when a shortened TTI is used, it is possible to increase the number of user terminals that can be accommodated per unit time (e.g. 1 ms). Hence, using a shorter shortened TTI than the normal TTI as a processing unit such as a transmission time unit of one data/packet subjected to channel coding, or processing units such as scheduling and link adaptation for future radio communication systems is studied.

Figure 2A:
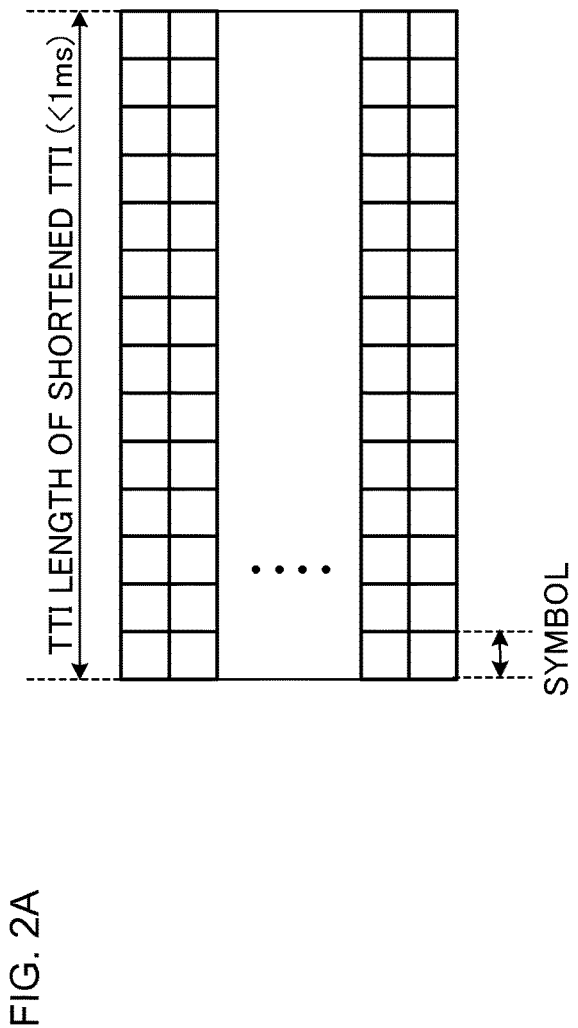
FIGS. 2A and 2B are diagrams illustrating arrangement examples of shortened TTIs.
Figure 2B:
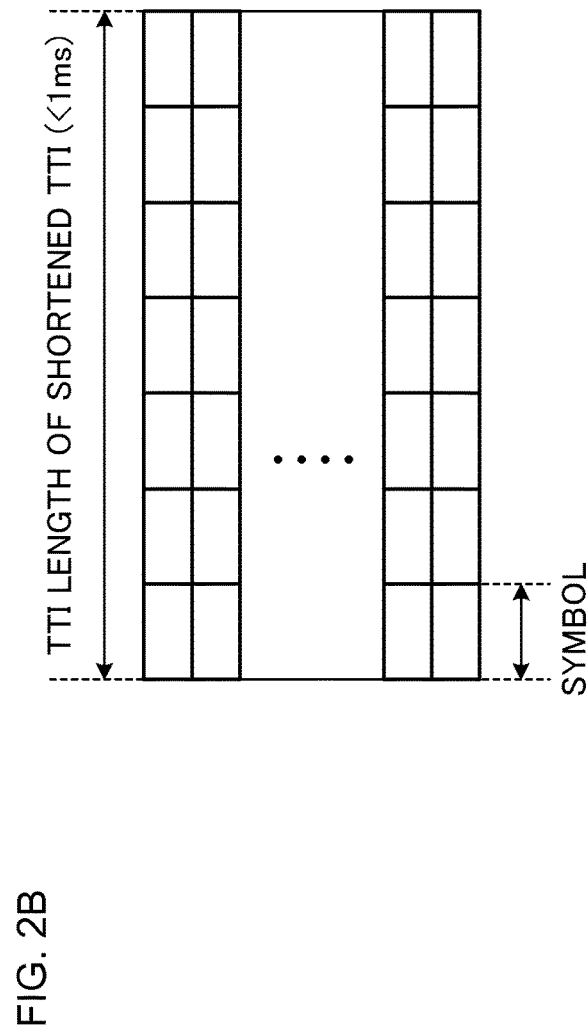

Each shortened TTI will be described with reference to FIGS. 2 and 3. FIG. 2 are diagrams illustrating arrangement examples of shortened TTIs. As illustrated in FIGS. 2A and 2B, each shortened TTI has a time length (TTI length) shorter than 1 ms. The shortened TTI may be one or a plurality of TTI lengths such as 0.5 ms, 0.2 ms and 0.1 ms whose multiples are 1 ms. Alternatively, the normal TTI includes 14 symbols in the case of the normal CP, and therefore may be one or a plurality of TTI lengths such as 7/14 ms, 4/14 ms, 3/14 ms and 1/14 ms that are integer multiples of 1/14 ms. Further, the normal TTI includes 12 symbols in the case of the enhanced CP, and therefore may be one or a plurality of TTI lengths such as 6/12 ms, 4/12 ms, 3/12 ms and 1/12 ms that are integer multiples of 1/12 ms. In this regard, the normal CP or the enhanced CP can also be configured for each shortened TTI, too, by broadcast information or higher layer signaling such as RRC signaling similar to conventional LTE. Consequently, it is possible to introduce shortened TTIs while maintaining compatibility (synchronization) with the normal TTI that is 1 ms.

FIG. 2A is a diagram illustrating a first arrangement example of a shortened TTI. As illustrated in FIG. 2A, in the first arrangement example, each shortened TTI is configured by the same number of symbols (14 symbols herein) as that of the normal TTI, and each symbol includes a shorter symbol length than a symbol length (e.g. 66.7 μs) of the normal TTI.

As illustrated in FIG. 2A, when the number of symbols of the normal TTI is maintained and the symbol length is shortened, it is possible to appropriate a physical layer signal configuration (e.g. RE arrangement) of the normal TTI. Further, when the number of symbols of the normal TTI is maintained, it is possible to include the identical information amount (bit amount) as that of the normal TTI in the shortened TTI, too. Meanwhile, the shortened TTI has a different symbol time length as a symbol of the normal TTI, and therefore it is difficult to perform frequency multiplexing on a signal of the shortened TTI illustrated in FIG. 2A and a signal of a normal TTI on an identical system band (or a cell or a CC).

Further, a symbol length and a subcarrier interval have a relationship of a reciprocal, and therefore when the symbol length is shortened as illustrated in FIG. 2A, the subcarrier interval is wider than 15 kHz of the normal TTI. When the subcarrier interval becomes wide, it is possible to effectively prevent deterioration of transmission quality caused by an inter-channel interference due to Doppler shift during movement of a user terminal, and phase noise of a receiver of the user terminal. Particularly, by widening the subcarrier interval at a high frequency band such as several tens of GHz, it is possible to effectively prevent deterioration of transmission quality.

FIG. 2B is a diagram illustrating a second arrangement example of a shortened TTI. As illustrated in FIG. 2B, in the second arrangement example, the shortened TTI is configured by a smaller number of symbols than that of each normal TTI, and each symbol includes the same symbol length (e.g. 66.7 μs) as that of each normal TTI. In, for example, FIG. 2B, when the shortened TTI has half a time length (0.5 ms) as that of each normal TTI, the shortened TTI is configured by symbols (seven symbols herein) that are half as those of each normal TTI.

As illustrated in FIG. 2B, when the number of symbols is reduced while the symbol length is maintained, it is possible to reduce the information amount (bit amount) included in the shortened TTI compared to each normal TTI. Consequently, the user terminal can perform reception processing (e.g. demodulation and/or decoding) on information included in the shortened TTI in a shorter time than that of each normal TTI, and reduce processing delay. Further, it is possible to perform frequency multiplexing on the signal of each shortened TTI illustrated in FIG. 2B and the signal of each normal TTI on the identical system band (or a cell or a CC), and maintain compatibility with the normal TTI.

In this regard, FIGS. 2A and 2B illustrate examples of the shortened TTIs that assume the normal CP (that the normal TTI is configured by 14 symbols). However, a configuration of each shortened TTI is not limited to the configurations illustrated in FIGS. 2A and 2B. In a case of the enhanced CP, for example, the shortened TTI in FIG. 2A may be configured by 12 symbols, and the shortened TTI in FIG. 2B may be configured by six symbols. Thus, each shortened TTI needs to have a shorter time length than that of each normal TTI, and the number of symbols, a symbol length and a CP length in each shortened TTI may be configured in any way.

Configuration examples of shortened TTIs will be described with reference to FIG. 3. The future radio communication systems may be configured to be able to configure both of each normal TTI and each shortened TTI such that the future radio communication systems have compatibility with an existing LTE system.

Figure 3A:
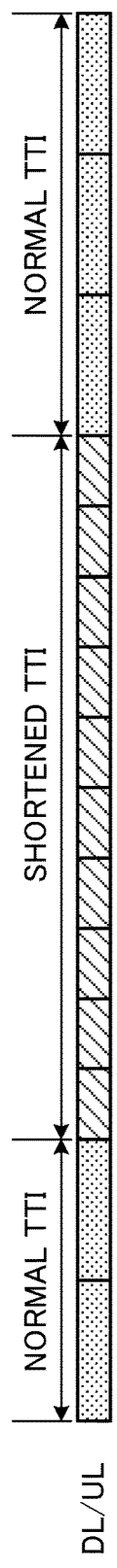
FIGS. 3A to 3C are diagrams illustrating configuration examples of shortened TTIs.

As illustrated in, for example, FIG. 3A, there is a temporal mixture of the normal TTIs and the shortened TTI in an identical CC (frequency domain). More specifically, the shortened TTI may be configured to a specific subframe of the identical CC (or a specific time unit such as a specific radio frame). In, for example, FIG. 3A, the shortened TTI is configured to five continuous subframes in the identical CC, and the normal TTIs are configured to other subframes. In this regard, the number and positions of subframes to which the shortened TTIs are configured are not limited to those illustrated in FIG. 3A.

Figure 3B:
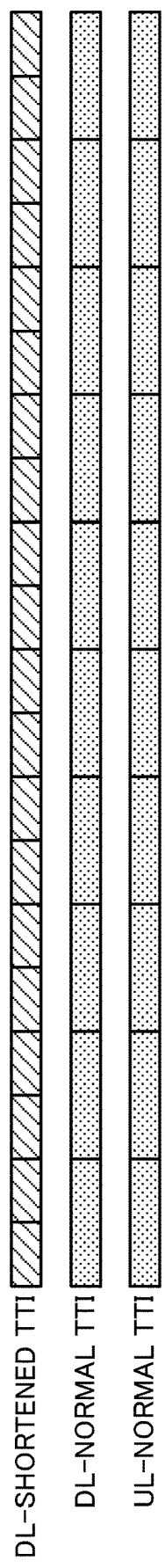

Further, as illustrated in FIG. 3B, CCs of the normal TTIs and CCs of the shortened TTI may be integrated to perform Carrier Aggregation (CA) or Dual Connectivity (DC). More specifically, the shortened TTI may be configured to a specific CC (more specifically, DL and/or UL of the specific CC). In, for example, FIG. 3B, the shortened TTI is configured to DL of the specific DL, and the normal TTIs are configured to DL and UL of the other CCs. In this regard, the number and positions of CCs to which the shortened TTIs are configured are not limited to those illustrated in FIG. 3B.

Further, in a case of CA, the shortened TTI may be configured to a specific CC (a Primary (P) cell or/and a Secondary (S) cell) of the identical radio base station. Meanwhile, in a case of DC, the shortened TTI may be configured to a specific CC (a P cell or/and a S cell) in a Master Cell Group (MCG) formed by a first radio base station, or may be configured to a specific CC (a Primary Secondary (PS) cell or/and a S cell) in a Secondary Cell Group (SCG) formed by a second radio base station.

Figure 3C:
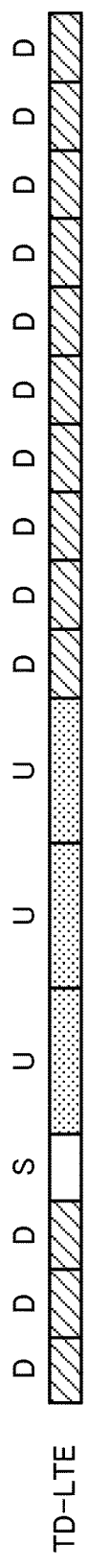

Further, as illustrated in FIG. 3C, the shortened TTIs may be configured to one of DL and UL. In, for example, FIG. 3C, a TDD system configures the normal TTIs to UL and configures the shortened TTIs to DL.

Further, DL or UL specific channels or signals may be allocated (configured) to the shortened TTIs. For example, an uplink control channel (PUCCH: Physical Uplink Control Channel) may be allocated to each normal TTI, and an uplink shared channel (PUSCH: Physical Uplink Shared Channel) may be allocated to each shortened TTI. For example, in this case, the user terminal transmits a PUCCH by using each normal TTI and transmits the PUSCH by using each shortened TTI.

In FIG. 3, the user terminal configures (or/and detects) each shortened TTI based on implicit or explicit notification from the radio base station. (1) An example of implicit notification, and an example of explicit notification by (2) broadcast information or RRC (Radio Resource Control) signaling, (3) MAC (Medium Access Control) signaling, and (4) PHY (Physical) signaling will be described below.

In a case of the implicit notification, the user terminal may configure each shortened TTI (determine that a cell, a channel or a signal used to perform communication is a shortened TTI) based on a frequency band (e.g. a band for 5G or an unlicensed band), a system band (e.g. 100 MHz), whether or not LTB (Listen Before Talk) according to LAA (License Assisted Access) is applied, a type of data (e.g. control data or speech) to be transmitted, a logical channel, a transport block, a RLC (Radio Link Control) mode, and C-RNTI (Cell-Radio Network Temporary Identifier). Further, when control information (DCI) addressed to the user terminal is detected on a PDCCH and/or an EPDCCH of 1 ms mapped on one, two, three or four head symbols of each normal TTI, 1 ms including the PDCCH/EPDCCH may be determined as each normal TTI. When the control information (DCI) addressed to the user terminal on the PDCCH/EPDCCH (the PDCCH and/or the EPDCCH less than 1 ms mapped on symbols other than one to four head symbols of each normal TTI) employing a configuration other than the configurations, a predetermined time zone less than 1 ms including the PDCCH/EPDCCH may be determined as each shortened TTI. In this regard, the control information (DCI) addressed to the user terminal can be detected based on a CRC check result for DCI subjected to blind decoding.

In a case of (2) the broadcast information or the RRC signaling (higher layer signaling), the shortened TTI may be configured based on configuration information notified from the radio base station to the user terminal by the broadcast information or the RRC signaling. The configuration information indicates which CC or/and subframe is used as each shortened TTI or which channel or/and signal is transmitted and received by using each shortened TTI. The user terminal semi-statically configures each shortened TTI based on the configuration information from the radio base station. In this regard, a mode between each shortened TTI and each normal TTI may be switched by a RRC Reconfiguration procedure, Intra-cell HandOver (HO) in the P cell or a removal/addition procedure of a CC (S cell) in the S cell.

In a case of (3) the MAC signaling (L2 (Layer 2) signaling), each shortened TTI configured based on the configuration information notified by RRC signaling may be activated or de-activated by MAC signaling. More specifically, the user terminal activates or de-activates each shortened TTI based on a L2 control signal (e.g. MAC control element) from the radio base station. When a timer indicating an activation period of a shortened TTI is configured in advance by higher layer signaling such as RRC signaling, and when the L2 control signal activates each shortened TTI and then the shortened TTI is not allocated to UL/DL for a predetermined period, the user terminal may de-activate each shortened TTI. Such a shortened TTI de-activation timer may count a normal TTI (1 ms) as a unit or may count a shortened TTI (e.g. 0.25 ms) as a unit. In this regard, when a mode between each shortened TTI and each normal TTI is switched in the S cell, the S cell may be de-activated once or it may be regarded that a TA (Timing Advance) timer expires. Consequently, it is possible to provide a communication stop period during a mode switch.

In a case of (4) PHY signaling (L1 (Layer 1) signaling), each shortened TTI configured based on the configuration information notified by RRC signaling may be scheduled by PHY signaling. More specifically, the user terminal detects each shortened TTI based on information included in a received and detected L1 control signal (e.g. a downlink control channel (PDCCH: Physical Downlink Control Channel or an EPDCCH: Enhanced Physical Downlink Control Channel referred to as a PDCCH/EPDCCH)).

When, for example, control information (DCI) for allocating transmission or reception using each normal TTI and each shortened TTI includes different information elements and (4-1) the user terminal detects the control information (DCI) including the information element for allocating transmission and reception using each shortened TTI, the user terminal may recognize as each shortened TTI a predetermined time zone including a timing at which the PDCCH/EPDCCH is detected. The user terminal can perform blind decoding on the control information (DCI) for allocating transmission and reception using both of each normal TTI and each shortened TTI on the PDCCH/EPDCCH. Alternatively, when (4-2) the user terminal detects the control information (DCI) including the information element for allocating transmission and reception using each shortened TTI, the user may recognize as each shortened TTI the predetermined time zone including a timing to transmit/receive the PDSCH or the PUSCH scheduled by this PDCCH/EPDCCH (used to transmit Downlink Control Information (DCI)). Alternatively, when (4-3) the user terminal detects the control information (DCI) including the information element for allocating transmission and reception using each shortened TTI, the user terminal may recognize as each shortened TTI a predetermined time zone including a timing to transmit or receive retransmission control information (also referred to as HARQ-ACK (Hybrid Automatic Repeat reQuest-Acknowledgement), ACK/NACK or A/N) for the PUSCH or the PUSCH scheduled by this PDCCH/EPDCCH (used to transmit the DCI).

When each shortened TTI is detected based on information included in a downlink control channel, the control information (DCI) for instructing transmission and reception using each shortened TTI may be transmitted or received a certain time before each shortened TTI is transmitted or received. That is, the radio base station transmits the control information (DCI) for instructing transmission/reception using each shortened TTI at a predetermined timing, and, when receiving the control information (DCI), the user terminal transmits or receives each shortened TTI after a predetermined time (for example, after an integer multiple time of the TTI length or after an integer time of the subframe length). There is a probability that each shortened TTI and each normal TTI match different signal processing algorithms (e.g. channel estimation and error correction decoding). Thus, by transmitting or receiving the control information (DCI) for instructing transmission and reception using each shortened TTI a predetermined time before actually performing transmission or reception using each shortened TTI, the user terminal can secure a time for changing the signal processing algorithms.

When each shortened TTI is configured by higher layer signaling such as RRC signaling and the control information (DCI) transmitted or received on the downlink control channel is used to make a predetermined instruction, a method for switching to transmission or reception using each normal TTI may be applied. Generally, each shortened TTI that is requested to perform signal processing with low delay needs higher user processing performance than that of each normal TTI. Consequently, by restricting dynamic switching from each shortened TTI to each normal TTI, it is possible to alleviate a signal processing load of the user terminal caused by a change of the TTI length compared to a case where dynamic switching from each normal TTI to each shortened TTI is permitted.

Further, the user terminal may detect each shortened TTI based on a state of the user terminal (e.g. an Idle state or a Connected state). When, for example, the user terminal is in the Idle state, the user terminal may recognize all TTIs as the normal TTIs and perform blind decoding on only PDCCHs included in one to four head symbols of the normal TTIs of 1 ms. Further, when the user terminal is in the Connected state, the user terminal may configure (or/and detect) each shortened TTI based on at least one of the above examples of notification (1) to (4).

When each shortened TTI is configured as described above, what matters is how to configure a PUCCH transmitted by using each shortened TTI. By the way, PUCCH formats 1/1a/1b/2/2a/2b/3/4/5 are defined as a PUCCH configuration (format) (referred to as a PUCCH format or a PF below) transmitted by using each normal TTI (subframe).

Uplink Control Information (UCI) is transmitted by using each PUCCH format. In this regard, the UCI includes at least one of transmission acknowledgement information (HARQ-ACK) for a downlink shared channel (PDSCH: Physical Downlink Shared Channel), Channel State Information (CSI) indicating a channel state, and a Scheduling Request (SR) of an uplink shared channel (PUSCH).

FIG. 4 are diagrams illustrating examples of PUCCH formats used for normal TTIs. In this regard, a case where normal CP is used will be described as an example with reference to FIG. 4 yet the present invention is not limited to this. Each PUCCH format (PF) can be optionally changed and applied to a case where enhanced CP is used, too.

Figure 4A:
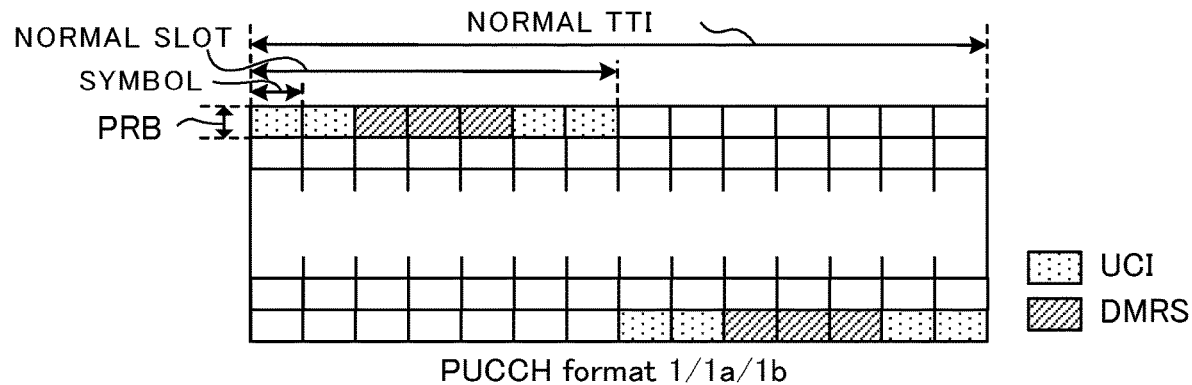
FIGS. 4A to 4D are diagrams illustrating examples of a PF of normal TTIs.

As illustrated in FIG. 4A, according to PFs 1/1a/1b, three center symbols of each normal slot are used for a DeModulation Reference Signal (DMRS), and the rest of four symbols are used for the UCI. The UCI is modulated by BPSK (Binary Phase Shift Keying) or QPSK (Quadrature Phase Shift Keying), and is spread (CS spreading and time spreading) at a maximum spreading factor 36. According to the PFs 1/1a/1b, the UCI including two bits at maximum is transmitted.

Figure 4B:
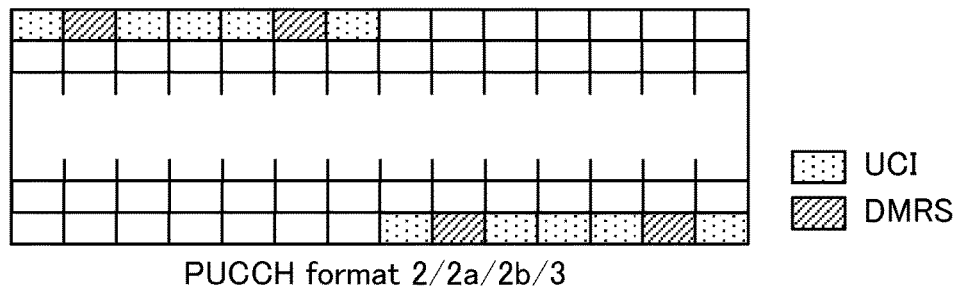

As illustrated in FIG. 4B, according to PFs 2/2a/2b, two symbols of the second symbol and the sixth symbol from the left of each normal slot are used for the DMRS, and the rest of five symbols are used for the UCI. The UCI is modulated by QPSK, and is subjected to Cyclic Shift (CS) spreading at a maximum spreading factor 12. According to the PFs 2/2a/2b, 20 bits are transmitted at maximum.

As illustrated in FIG. 4B, according to a PF 3, too, two symbols of the second symbol and the sixth symbol from the left of each normal slot are used for the DMRS, and the rest of five symbols are used for the UCI. The UCI is modulated by QPSK, and is subjected to time spreading at a maximum spreading factor 5. According to the PF 3, 48 bits are transmitted at maximum.

Figure 4C:
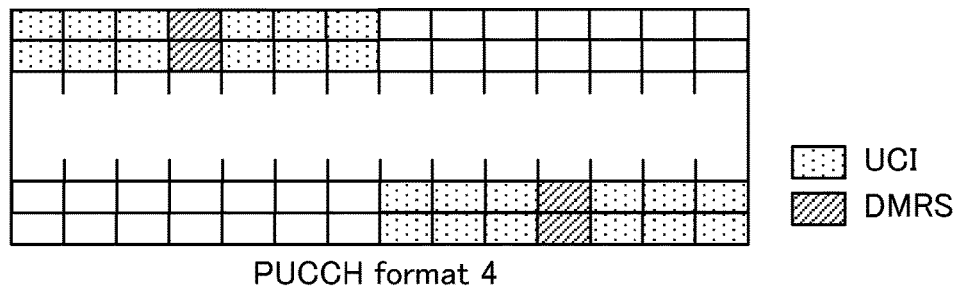

As illustrated in FIG. 4C, according to a PF 4, one center symbol of each normal slot is used for the DMRS, and the rest of six symbols are used for the UCI. Further, one or a plurality of resource blocks (Physical Resource Blocks (PRB) (two PRBs in FIG. 4C) is used per normal slot. The UCI is modulated by QPSK, and is not spread. According to the PF 4, a predetermined number of bits (e.g. 100 bits or more) are transmitted by using one or a plurality of PRBs.

Figure 4D:
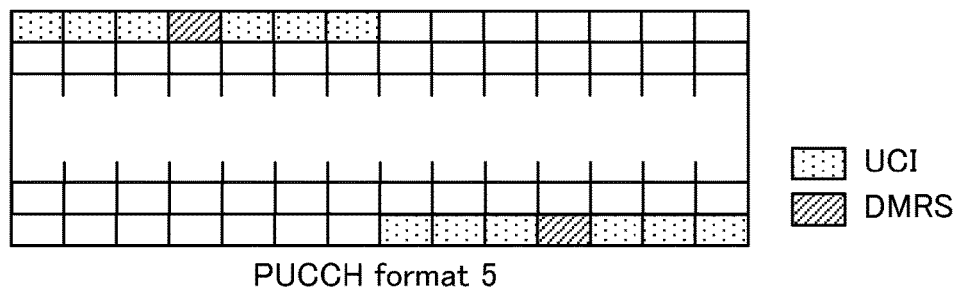

As illustrated in FIG. 4D, according to a PF 5, one center symbol of each normal slot is used for the DMRS, and the rest of six symbols are used for the UCI. The UCI is modulated by QPSK, and is subjected to frequency spreading at a maximum spreading factor 2. Further, one PRB is used per normal slot. According to the PF 5, a predetermined number of bits or more (e.g. 50 bits or more) are transmitted.

According to each PF illustrated in FIGS. 4A to 4D, frequency hopping is applied between normal slots. Further, according to the PFs 1/1a/1b/3, a copy of the same bit sequence between the normal slots is transmitted.

However, it is assumed that each PF of the above normal TTI is not applicable as is to each shortened TTI (see FIG. 2B) configured by a smaller number of symbols as that of the normal TTI.

Figure 5A:
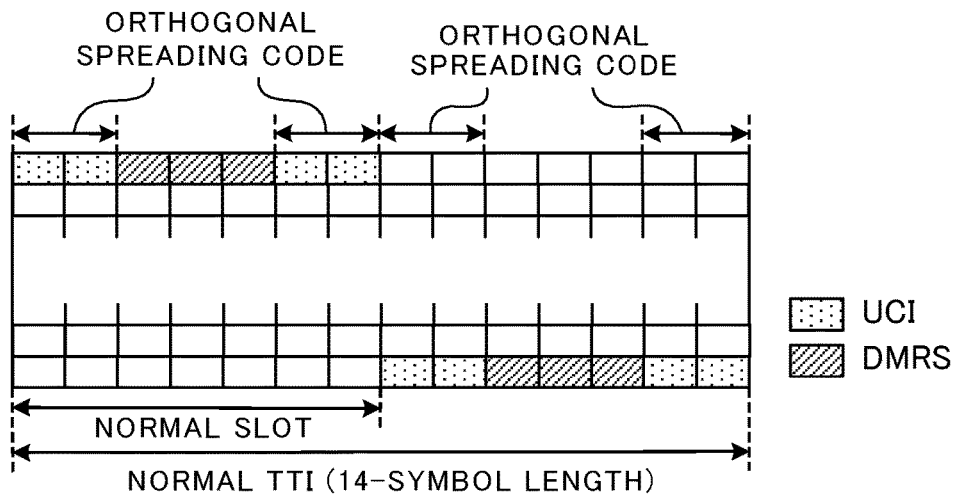
FIGS. 5A to 5C are diagrams illustrating application examples of PFs 1/1a/1b with respect to shortened TTIs.

There is a case where, when, for example, the PFs 1/1 a/1 b/3 are simply applied to each shortened TTI, it is not possible to multiplex signals of user terminals. FIG. 5 are diagrams illustrating application examples of the PFs 1/1a/1 b with respect to shortened TTIs. As illustrated in FIG. 5A, according to the PFs 1/1 a/1 b, the same bit sequence is copied to each symbol (also referred to as an information symbol) for the UCI in each normal slot, and signals of a plurality of user terminals are multiplexed by using different orthogonal spreading codes (e.g. an orthogonal sequence of a sequence length 4).

Figure 5B:
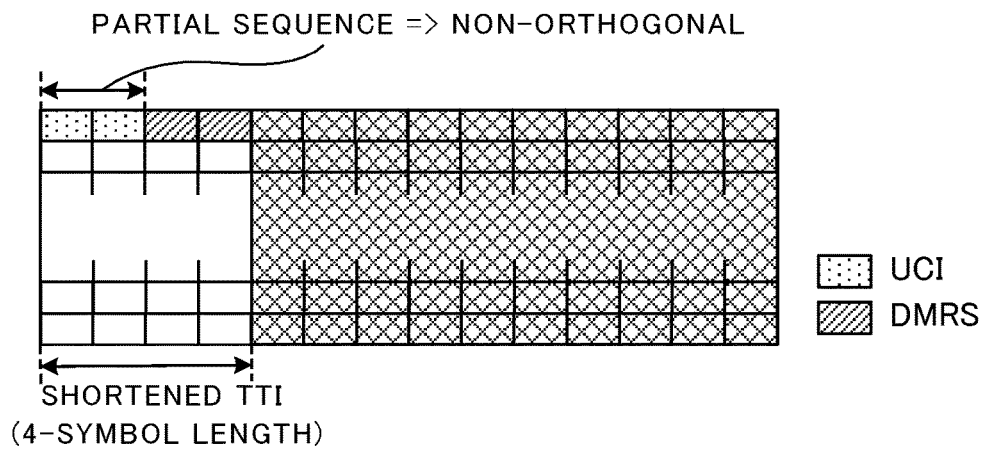

As illustrated in FIG. 5B, when each shortened TTI is configured by a smaller number of symbols (e.g. four symbols) than that of one slot, spreading codes in a time (symbol) direction are not orthogonal (for example, an orthogonal sequence of the sequence length 4 becomes a partial sequence of a sequence length 2 and becomes non-orthogonal), and therefore, it is not possible to appropriately multiplex signals of a plurality of user terminals.

Figure 5C:
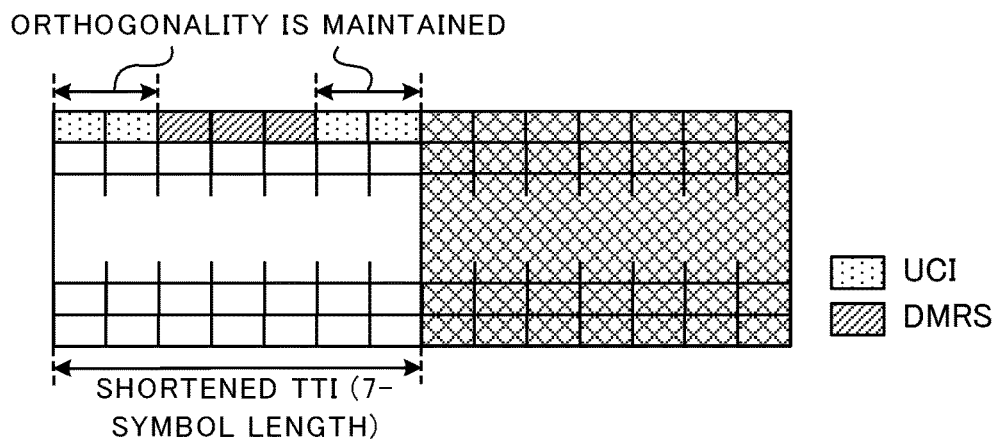

Meanwhile, as illustrated in FIG. 5C, when each shortened TTI is configured by the same number of symbols (seven symbols in the case of the normal CP) as that of the normal slot, it is possible to maintain orthogonality of spreading codes in the time direction (use, for example, orthogonal sequences of the sequence length 4) and, consequently appropriately multiplex signals of a plurality of user terminals. In this regard, FIG. 5 illustrate examples of the PFs 1/1 a/1 b, and the same applies to the PF 3, too.

Figure 6A:
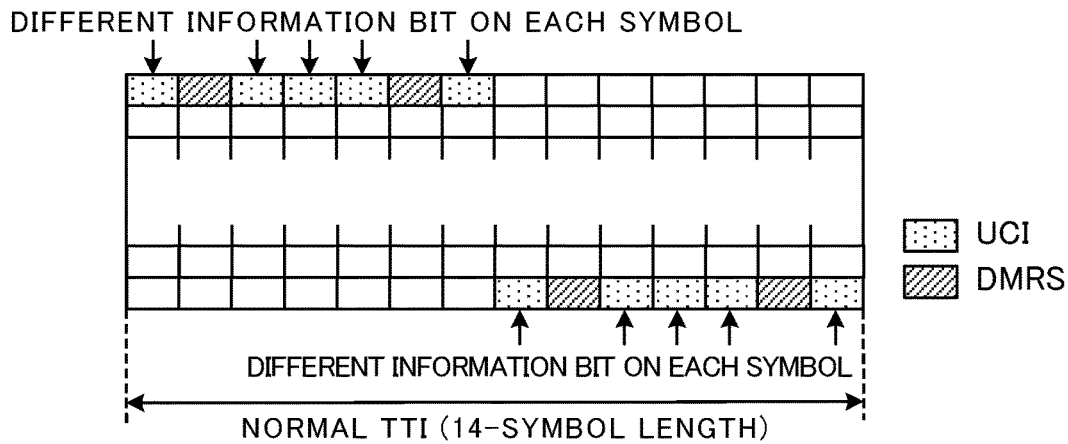
FIGS. 6A to 6C are diagrams illustrating application examples of PFs 2/2a/2b with respect to shortened TTIs.

Further, when the above PFs 2/2a/2b/4/5 are simply applied to each shortened TTI, there is a case where a payload decreases. FIG. 6 are diagrams illustrating application examples of the PFs 2/2a/2b with respect to shortened TTIs. As illustrated in FIG. 6A, according to the PFs 2/2a/2b, different information bits (e.g. two-bit coding bits) are mapped on each information symbol.

Figure 6B:
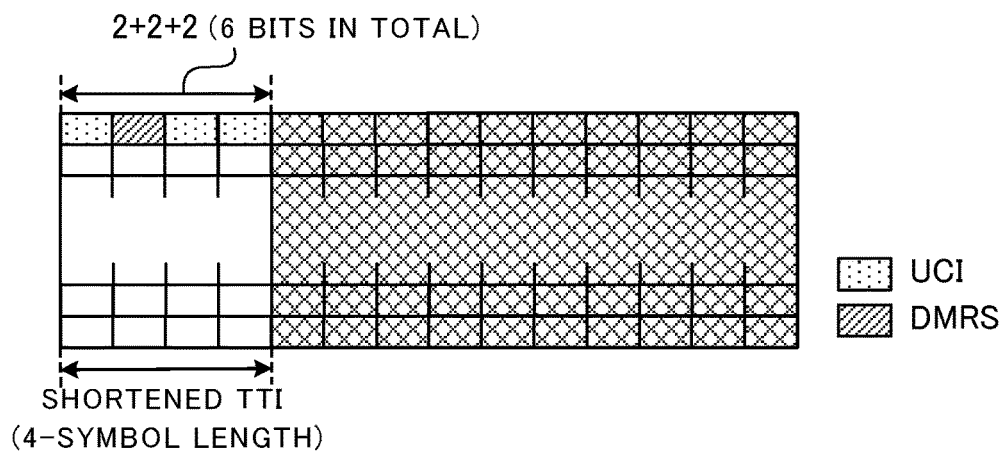

Hence, when the PFs 2/2a/2b are applied to a shortened TTI, only coding bits the number of which is proportional to the number of information symbols in the shortened TTI can be mapped. When, for example, each shortened TTI is configured by four symbols of three information symbols and one symbol for the DMRS (also referred to as a DMRS symbol below) as illustrated in FIG. 6B, encoded bits of 2×3=6 bits are mapped.

Figure 6C:
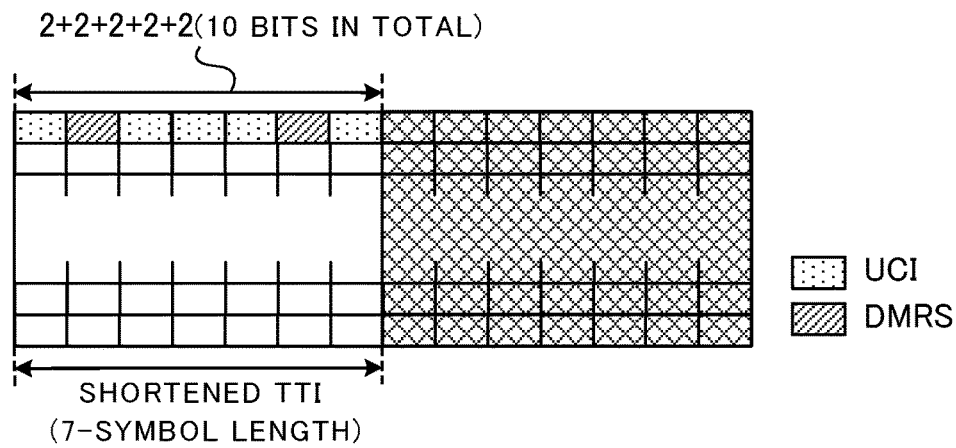

Further, when each shortened TTI is configured by seven symbols including five information symbols and two DMRS symbols as illustrated in FIG. 6C, encoded bits of 2×5=10 bits are mapped. In this regard, FIG. 5 illustrate the examples of the PFs 2/2a/2b yet the same applies to the PFs 4/5, too.

Thus, a case where each PUCCH format of each normal TTI does not match each shortened TTI (see FIG. 2B) configured by a smaller number of symbols than that of each normal TTI is also assumed. Hence, applying each shortened TTI only to other physical channels (e.g. a PUSCH and a PDSCH), and applying each normal TTI to the PUCCH are also considered. However, when each normal TTI is applied to the PUCCH, an effect of latency reduction (referred to a latency reduction effect below) provided by applying each shortened TTI to the other physical channels is limited.

Hence, the inventors of the present invention have focused on that it is desirable to apply each shortened TTI to the PUCCH, too, to efficiently obtain the latency reduction effect, and have studied a PUCCH format matching each shortened TTI.

Embodiments of the present invention will be described in detail with reference to the drawings below. In this regard, in the present embodiment, each shortened TTI (second TTI) is configured by a smaller number of symbols than that of each normal TTI (first TTI), and each symbol includes the same symbol length as that of each normal TTI (see FIG. 2B). In this regard, the number of shortened TTIs included in each normal TTI is, for example, two or four yet is not limited to this.

Further, each shortened TTI may be referred to as a partial TTI, a short TTI, a sTTI, a shortened subframe or a short subframe. Each normal TTI is also referred to as a TTI, a long TTI, one TTI, a normal TTI, a common subframe, a long subframe or a normal subframe or simply as a subframe.

Further, a slot of each shortened TTI that is a frequency hopping unit is referred to as a shortened slot, a partial slot or a short slot. A slot of each normal TTI that is a frequency hopping unit is referred to as a common slot, a long slot or a normal slot or simply as a slot. A slot of each shortened TTI and each normal TTI that is a frequency hopping unit is referred to as a slot, a shortened slot or a normal slot.

Further, a case where normal CP is applied to each symbol will be exemplified below yet the present invention is not limited to this. The present embodiment is optionally applicable to a case where enhanced CP is applied to each symbol, too. Further, a reference signal used to demodulate (channel estimation) of a PUCCH will be referred to as a DeModualtion Reference Signal (DMRS) yet the name of the reference signal is not limited to this.

First Embodiment

A case where a PUCCH format (new PUCCH format (PF)) for applying frequency hopping in each shortened TTI is newly defined will be described in the first embodiment.

A user terminal according to the first embodiment transmits UCI via a PUCCH by using each shortened TTI configured by (including) a smaller number of symbols than that of each normal TTI. More specifically, the user terminal transmits UCI by using a PRB subjected to frequency hopping between shortened TTIs in each shortened TTI, and maps the DMRS on at least one symbol that configures (is included in) the shortened slots.

<Arrangement Example of New PF>

Figure 7A:
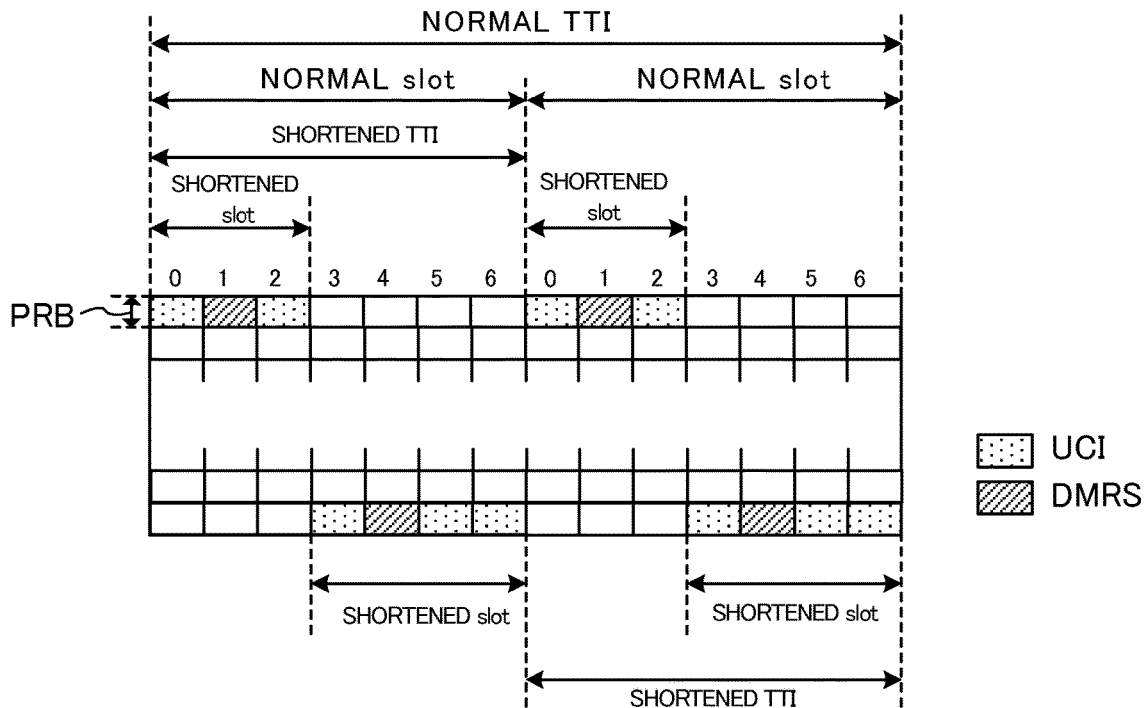
FIGS. 7A and 7B are diagrams illustrating a first arrangement example of a new PF according to a first embodiment.
Figure 7B:
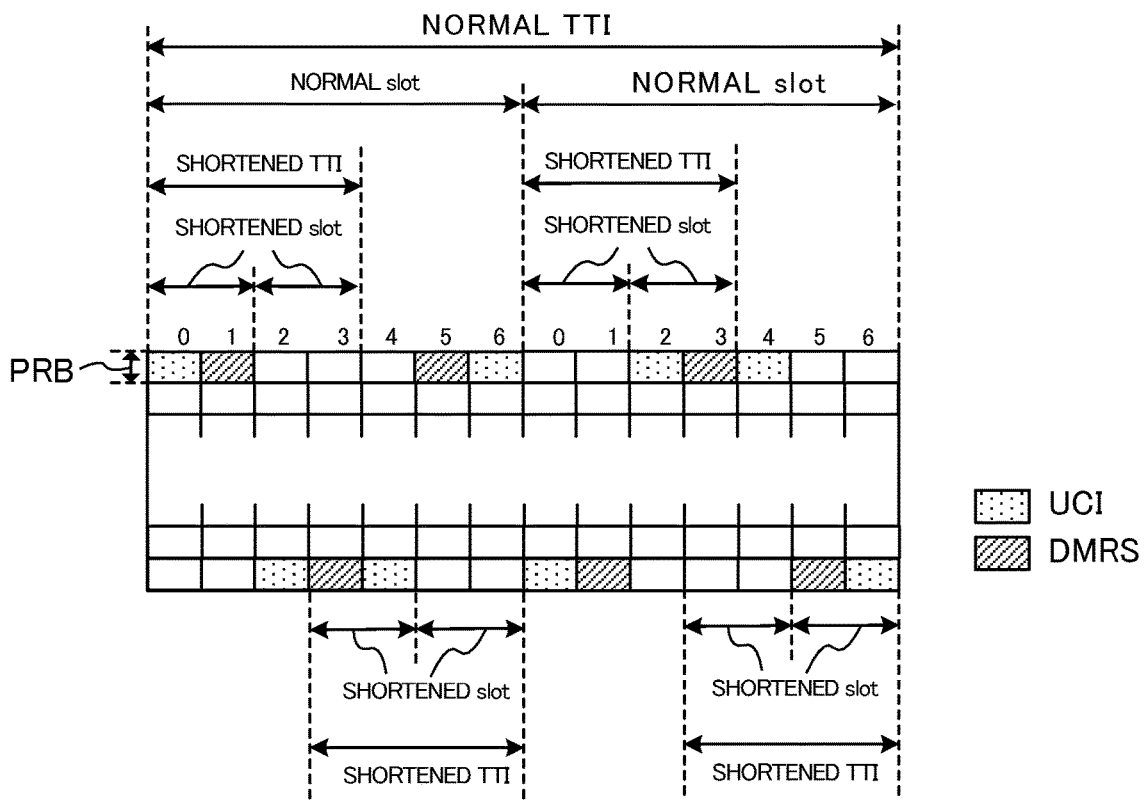

FIG. 7 are diagrams illustrating a first arrangement example of a new PF according to the first embodiment. FIG. 7A illustrates that each normal TTI includes two shortened TTIs (each normal slot includes one shortened TTI), and FIG. 7B illustrates that each normal TTI includes four shortened TTIs (each normal slot includes two shortened TTIs).

As illustrated in FIGS. 7A and 7B, frequency hopping of changing an allocation PRB from a PRB at one end of a frequency band (e.g. system band) (referred to as a support band) supported by the user terminal to a PRB at the other end is applied to each shortened TTI. Further, at least one DMRS symbol is provided in a predetermined number of symbols (shortened slots) to which an identical PRB is allocated. When a plurality of information symbols is included in each shortened slot, a spreading code may be applied between the information symbols.

When, for example, each shortened TTI is configured by seven symbols as illustrated in FIG. 7A, a PRB at one end of a support band is allocated to the former shortened slots (symbols #0 to #2) of each shortened TTI, and a PRB at the other end is allocated to the latter shortened slots (symbols #3 to #6). Further, a DMRS is mapped on the center symbol #1 of the former shortened slots. Furthermore, the DMRS is mapped on the symbol #4 of the latter shortened slots.

When the number of symbols of the latter shortened slots is made larger than the number of the former shortened slots as illustrated in FIG. 7A, and even when a Sounding Reference Signal (SRS) is arranged on a last symbol of a subframe, UCI can be transmitted by using two information symbols from which the DMRS symbol in the shortened slot including the last symbol is removed.

Further, in FIG. 7A, CS spreading may be applied at a predetermined spreading factor (e.g. the maximum spreading factor 12) to each information symbol in each shortened slot, and block spreading may be applied at a predetermined spreading factor (e.g. a spreading factor equal to the number of information symbols in each shortened slot) between a plurality of information symbols (e.g. the symbols #0 and #2) in each shortened slot. For example, CS spreading may be applied at the maximum spreading factor 12 to each of the symbols #0 and #2 of the former shortened slots, and block spreading may be applied to the maximum spreading 2 between the symbols #0 and #2. The CS spreading and the block spreading will be described below with reference to FIG. 10.

Meanwhile, when each shortened TTI is configured by four symbols as illustrated in FIG. 7B, at least one symbol may be shared between neighboring shortened TTIs. In FIG. 7B, the center symbol (symbol #3) in each normal slot is shared by the two shortened TTIs in each normal slot. In FIG. 7B, each shortened TTI is configured by the former and latter shortened slots, and frequency hopping is applied between the shortened slots. In this regard, a frequency hopping pattern may be reverse between the two shortened TTIs that share the symbol #3.

In FIG. 7B, too, each shortened slot includes at least one DMRS symbol. Further, in FIG. 7B, the DMRS symbol #3 is shared between the two shortened TTIs in each normal slot. Thus, when the identical DMRS symbol is shared by a plurality of shortened TTIs, DMRSs of a plurality of shortened TTIs may be multiplexed by cyclic shift and/or comb-shaped subcarrier arrangement (Comb). Further, although not illustrated in FIG. 7B, an identical information symbol may be shared between a plurality of shortened TTIs. Pieces of UCI of a plurality of shortened TTIs may be multiplexed by Comb.

In this regard, FIGS. 7A and 7B illustrate exemplary examples and the present invention is not limited to this. For example, the number of shortened TTIs included in each normal TTI is not limited to this. Further, not only frequency hopping in the shortened TTI is performed on the former and latter shortened slots but also may be applied per symbol, for example.

Furthermore, in FIGS. 7A and 7B, by using different shortened TTIs, different user terminals may transmit PUCCHs, or an identical user terminal may transmit PUCCHs. Still further, although not illustrated, the arrangement examples illustrated in FIGS. 7A and 7B may be combined. For example, one shortened TTI may be configured to the former normal slot as illustrated in FIG. 7A, two shortened TTIs may be configured to the latter normal slot as illustrated in FIG. 7B or vice versa.

Figure 8A:
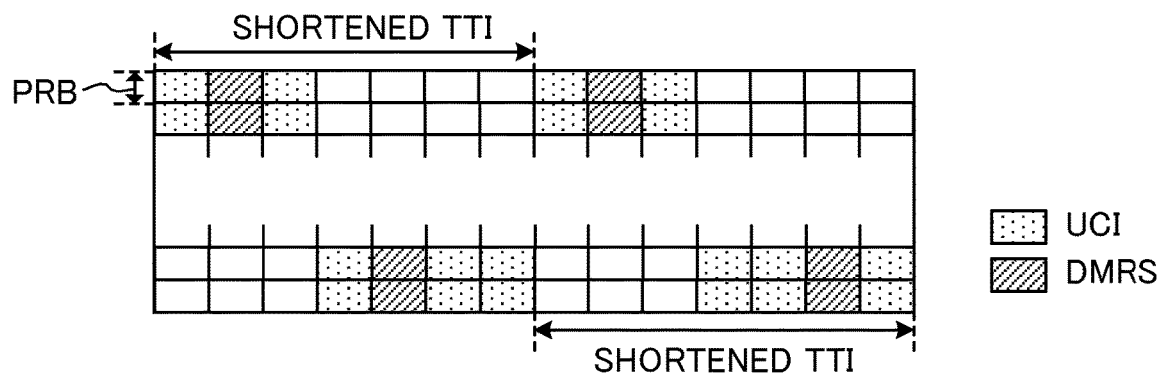
FIGS. 8A and 8B are diagrams illustrating a second arrangement example of a new PF according to the first embodiment.
Figure 8B:
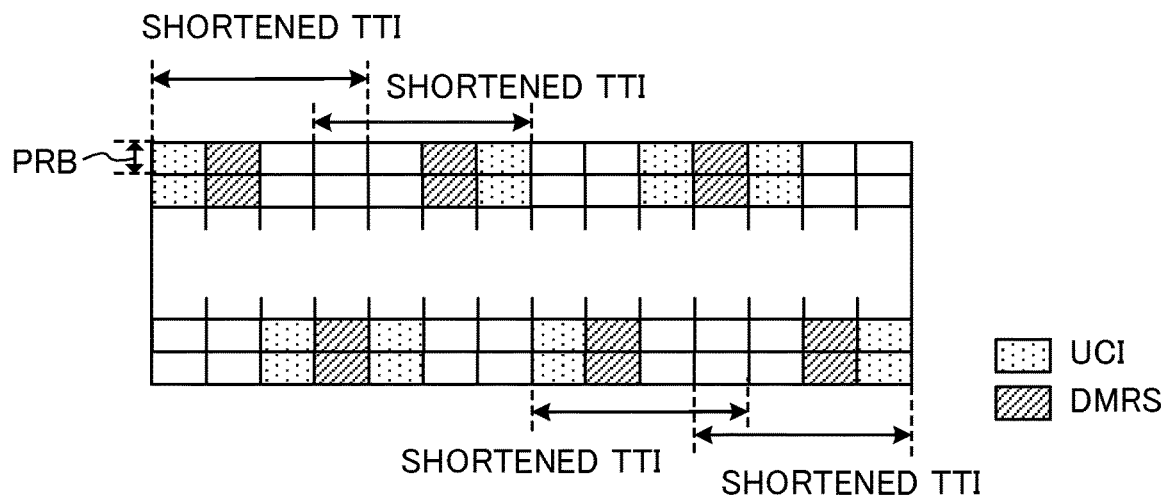

FIG. 8 are diagrams illustrating a second arrangement example of a new PF according to the first embodiment. FIG. 8A illustrates that each shortened TTI is configured by seven symbols, and FIG. 8B illustrates that each shortened TTI is configured by four symbols. In this regard, differences of FIG. 8 from FIG. 7 will be mainly described.

As illustrated in FIGS. 8A and 8B, the new PF may be configured by one or more PRBs per shortened slot. For example, in FIGS. 8A and 8B, the new PF is configured by two PRBs per shortened slot. The new PF has a smaller number of information symbols than that of a PF of the normal TTI, and therefore a payload decreases (or a coding gain or a spreading processing gain of encoding or spreading is reduced). As illustrated in FIGS. 8A and 8B, by enhancing the new PF in a frequency direction, it is possible to compensate for a decrease in a payload (improve the coding gain or the spreading processing gain of coding or spreading) caused by a decrease in information symbols.

Figure 9A:
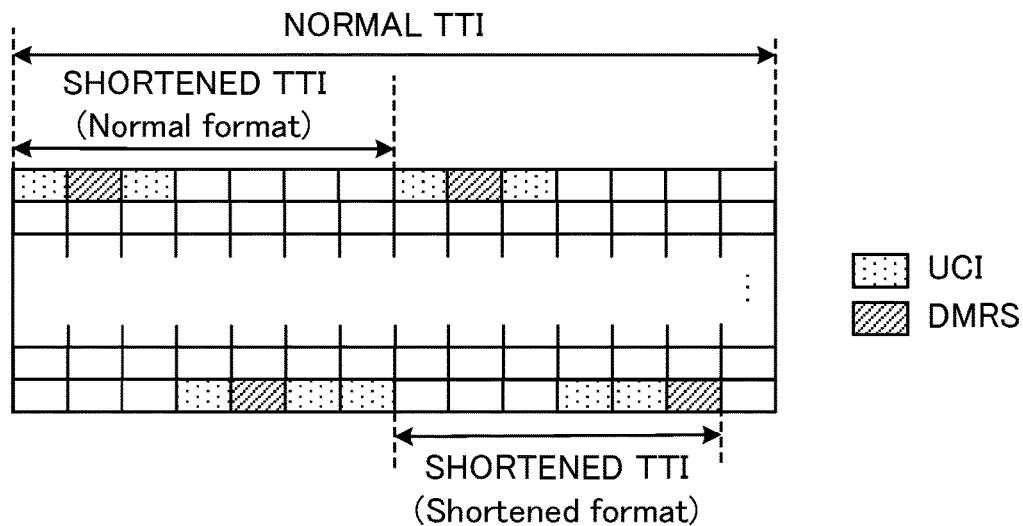
FIGS. 9A and 9B are diagrams illustrating a third arrangement example of a new PF according to the first embodiment.
Figure 9B:
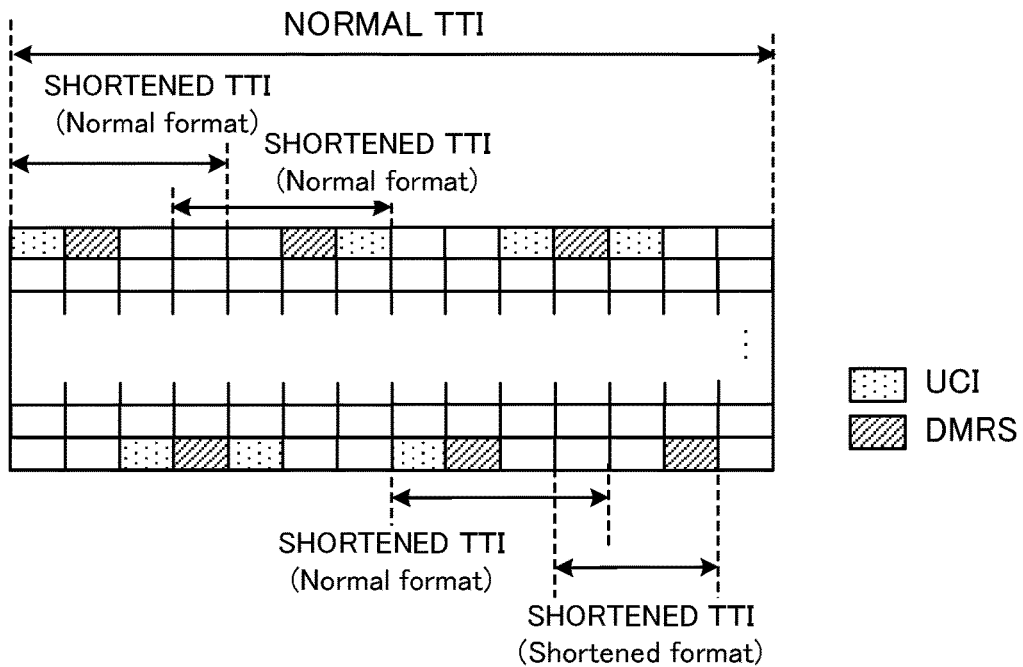

FIG. 9 are diagrams illustrating a third arrangement example of a new PF according to the first embodiment. FIG. 9A illustrates that each shortened TTI is configured by seven symbols, and FIG. 9B illustrates that each shortened TTI is configured by four symbols. In this regard, differences of FIG. 9 from FIGS. 7 and 8 will be mainly described.

A cell specific or user terminal specific SRS is assumed to be transmitted by using a last symbol of each normal TTI. Hence, when a PUCCH is transmitted by using a shortened TTI including a SRS symbol as illustrated in FIGS. 9A and 9B, a Shortened format from which the last symbol is removed may be applied to this shortened TTI. In this regard, a format from which the last symbol is not removed may be referred to as a Normal format. Further, the number of symbols of each shortened TTI of the shortened format may take a value obtained by subtracting one from the number of symbols of each shortened TTI of the normal format.

<Spreading Example of New PF>

Hereinafter, spreading of the new PF will be described in detail. According to the new PF, Code Division Multiplexing (CDM) may be performed on signals of a plurality of user terminals by applying orthogonal spreading (time and/or frequency spreading) at a predetermined spreading factor.

Further, according to the new PF, phase rotation (CS spreading) may be applied to each symbol. FIG. 10 are diagrams illustrating spreading examples of a new PF according to the first embodiment.

Figure 10A:
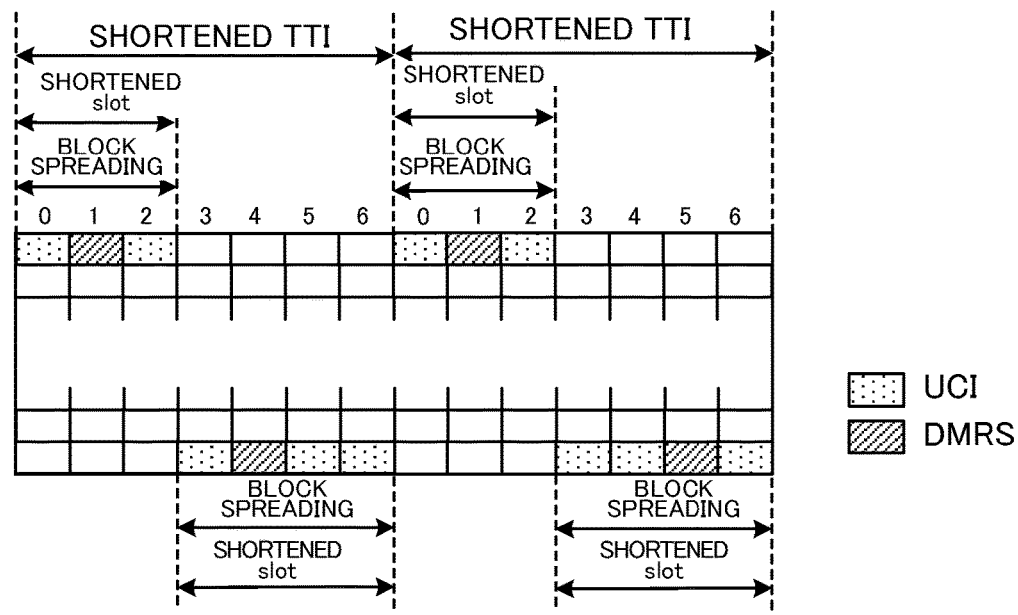
FIGS. 10A and 10B are diagrams illustrating spreading examples of a new PF according to the first embodiment.

FIG. 10A illustrates an example of block spreading (orthogonal spreading) in each shortened slot. When each shortened slot includes a plurality of information symbols as illustrated in FIG. 10A, a plurality of information symbols may be spread by using an orthogonal spreading code of a sequence length (a spreading factor and a code length) equal to the number of a plurality of information symbols. More specifically, a user terminal may copy the same UCI (modulated symbols) between a plurality of information symbols in each shortened TTI, and spread the copied UCI by using an orthogonal spreading code $[W_0, \ldots, W_{N-1}]$ having an equal length to the number of information symbols (N) of each shortened slot.

For example, in FIG. 10A, the former shortened slots in each shortened TTI include two information symbols, and the latter shortened slots include three information symbols. In the former shortened slots, the same UCI is copied to the symbols #0 and #2, $W_0$ of orthogonal spreading codes $[W_0, W_1]$ of a code length 2 is multiplied on the UCI of the symbol #0, and $W_1$ is multiplied on the UCI of the symbol #2. Similarly, in the latter shortened slots, the same UCI is copied to symbols #3, #5 and #6, $W_0$ of orthogonal spreading codes $[W_0, W_1, W_2]$ of a code length 3 is multiplied on the UCI of the symbol #3, and $W_2$ is multiplied on the UCI of the symbol #6.

When block spreading is applied by using an orthogonal spreading code of a sequence length (a spreading factor and a code length) equal to the number of information symbols in a shortened slot as illustrated in FIG. 10A, it is possible to multiplex signals of user terminals the number of which is proportional to the number of information symbols in this shortened slot.

In this regard, the spreading can be performed in the frequency (subcarrier) direction, too. When, for example, a new PF is transmitted by using continuous M PRBs, 12×M subcarriers are used per symbol. Hence, the 12×M subcarriers are divided into N groups, and 12×M/N symbols are mapped on each group and can be spread by using a spreading code of a length N.

Figure 10B:
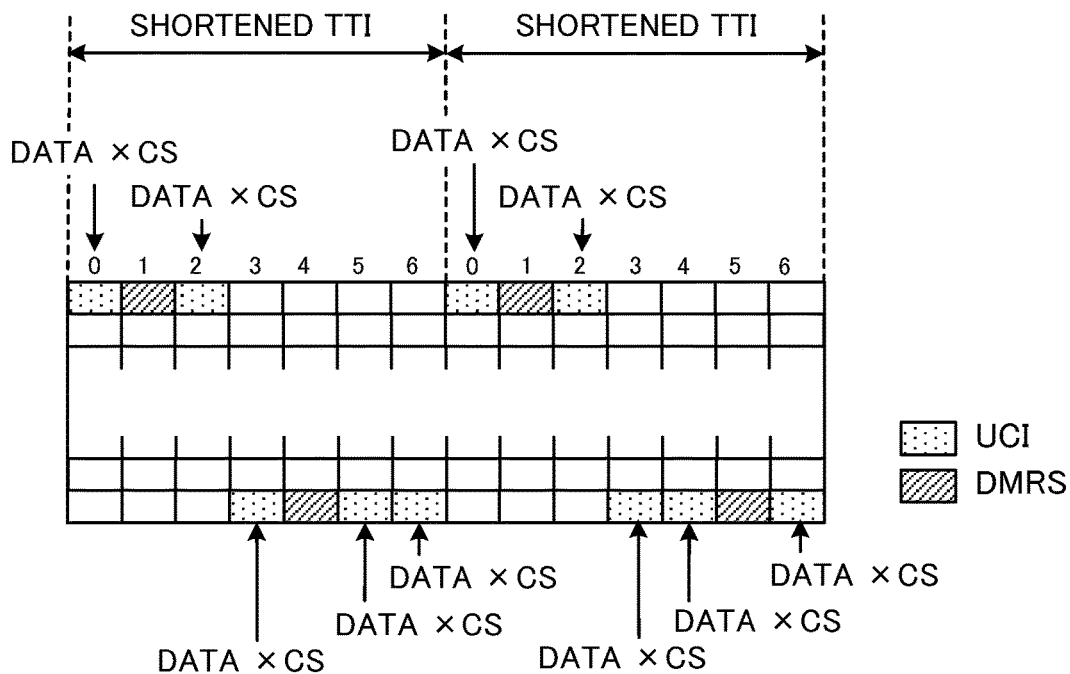

FIG. 10B illustrates an example of CS spreading (phase rotation) applied to each information symbol. As illustrated in FIG. 10B, the user terminal may map different UCI (modulated symbol) on each information symbol in each shortened TTI, and perform CS spreading that uses CS of a predetermined length (spreading factor) on the UCI of each information symbol. For example, in FIG. 10B, the different pieces of UCI may be mapped on the symbol #0 and #2 of the former shortened slots, and may be multiplied with a CS sequence of a length 12. Further, the different pieces of UCI may be mapped on the symbol #3, #5 and #6 of the latter shortened slots, respectively, and may be multiplied with a CS sequence of a length 12.

When the different UCI is mapped on each information symbol in each shortened TTI and is subjected to CS spreading as illustrated in FIG. 10B, it is possible to increase an UCI payload in proportion to the number of information symbols in each shortened TTI.

In this regard, FIGS. 10A and 10B illustrate that each shortened TTI is configured by seven symbols (see FIG. 7A), yet the present invention is not limited to this. The spreading examples illustrated in FIGS. 10A and 10B are optionally applicable to a case where each shortened TTI is configured by four symbols (see FIG. 7B), too. Further, the spreading examples illustrated in FIGS. 10A and 10B may be combined as described with reference to FIG. 7A.

<PRB Index for New PF>

Figure 11A:
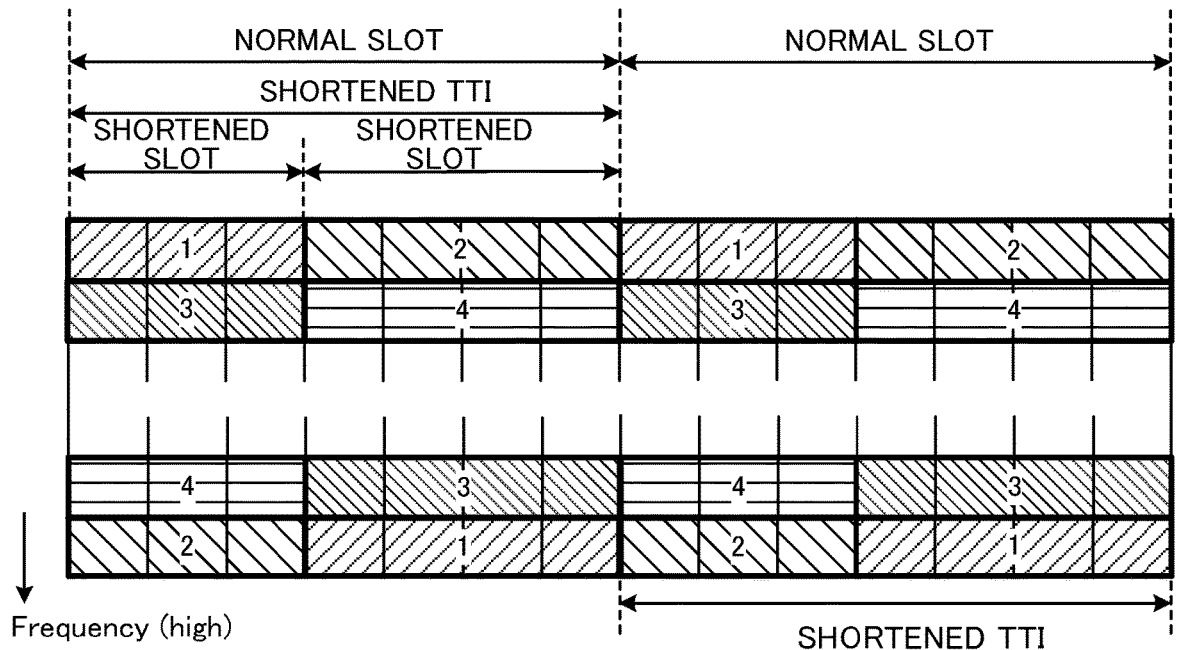
FIGS. 11A and 11B are diagrams illustrating examples of PRB indices according to the first embodiment.
Figure 11B:
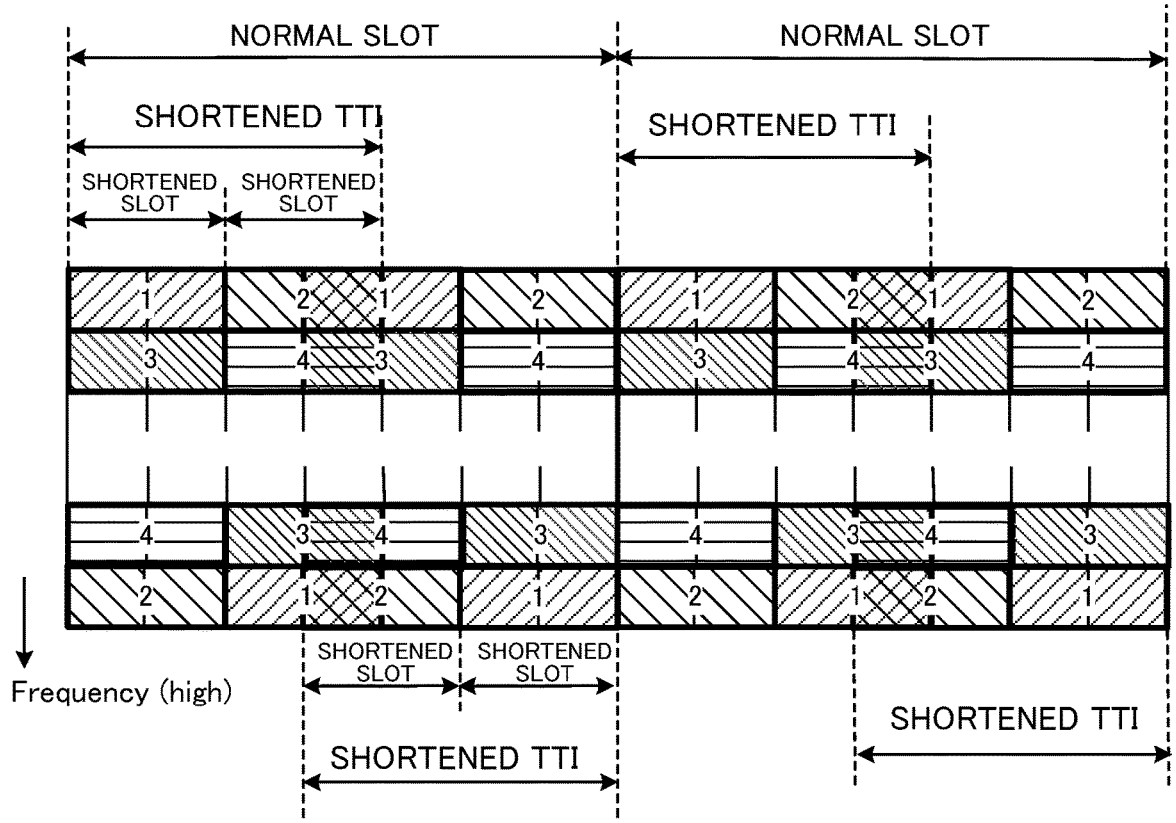

FIG. 11 are diagrams illustrating examples of PRB indices used in the first embodiment. FIG. 11A illustrates that each shortened TTI is configured by seven symbols, and FIG. 11B illustrates that each shortened TTI is configured by four symbols. Further, numbers allocated in FIGS. 11A and 11B indicate indices of PRBs (PRB indices). Furthermore, FIGS. 11A and 11B illustrate support bands of the user terminal, and an upper portion is a low frequency band and a lower portion is a high frequency band yet this relationship may be reversed.

When each shortened TTI is configured by seven symbols as illustrated in FIG. 11A, an identical PRB index is allocated to PRBs at frequency positions of the former shortened slots and the latter shortened slots that are symmetrical with respect to a center frequency of the user terminal as a center. For example, in FIG. 11A, a PRB index #1 is allocated to a PRB of a minimum frequency of the support band in the former shortened slots, and is allocated to a PRB of a maximum frequency in the latter shortened slots. Further, in FIG. 11A, PRB indices are allocated in ascending order from an outer side of the support band of the user terminal.

Similarly, when each shortened TTI is configured by four symbols as illustrated in FIG. 11B, an identical PRB index is allocated to PRBs at frequency positions of the former shortened slots and the latter shortened slots that are symmetrical with respect to the center frequency of the user terminal as the center.

Further, when the identical symbols are shared between a plurality of neighboring shortened TTIs as illustrated in FIG. 11B, PRB indices of a plurality of shortened TTIs may be allocated to PRBs of the shared symbols. For example, in FIG. 11B, a PRB index #2 for the first shortened TTI, and the PRB index #1 for the second shortened TTI are allocated to a PRB of the minimum frequency of the shared symbol.

A PRB index $n_{PRB}$ described above may be allocated based on, for example, following equation (1). In this regard, a parameter $n_x$ is a value determined based on a PUCCH resource, and a parameter $n_x$ is a number (index) of a shortened slot for a shortened TTI. Further, $N^{UL}_{RB}$ represents an uplink support band of the user terminal. In this regard, a PRB index allocating method is not limited to this.

[Mathematical 1]

$$n_{PRB} = \begin{cases} \left\lfloor \frac{m}{2} \right\rfloor & \text{if } (m + n_x \bmod 2) \bmod 2 = 0 \\ N^{UL}_{RB} - 1 - \left\lfloor \frac{m}{2} \right\rfloor & \text{if } (m + n_x \bmod 2) \bmod 2 = 1 \end{cases} \quad \text{(Equation 1)}$$

According to the first embodiment, frequency hopping is applied in each shortened TTI according to the new PF for the shortened TTI, so that it is possible to prevent deterioration of performance of the PUCCH while providing a latency reduction effect provided by introduction of each shortened TTI.

Second Embodiment

A case where a PF for a normal TTI is used for a shortened TTI will be described in the second embodiment. A user terminal according to the second embodiment transmits UCI via a PUCCH by using each shortened TTI configured by a smaller number of symbols than that of each normal TTI.

More specifically, the user terminal transmits UCI of each shortened TTI by using part of the PFs for each normal TTI, and maps a DMRS on at least one symbol that configures each shortened TTI.

<First Arrangement Example Based on PFs 1/1a/1b/3>

When each shortened TTI is configured by the same number of symbols (seven symbols in a case of normal CP) as that of each normal slot as described with reference to FIG. 5C, it is possible to maintain orthogonality of a spreading code in the time direction according to existing PFs 1/1a/1b/3 and appropriately multiplex signals of a plurality of user terminals. Hence, the user terminal configures a shortened TTI having the same number of symbols as that of each normal slot and applies the PFs 1/1a/1b/3 to this shortened TTI.

FIG. 12 are diagrams illustrating a first arrangement example based on the PFs 1/1a/1b/3 according to the second embodiment. As illustrated in FIG. 12, the first arrangement example permits only a shortened TTI (i.e. a shortened TTI of 0.5 ms) having the same number of symbols as that of each normal symbol, and does not permit a shortened TTI having a different number of symbols from that of each normal slot. As illustrated in FIG. 12, configurations of the PFs 1/1a/1b/3 of each former (or latter) normal slot of each normal TTI of 1 ms are applied to each shortened TTI of 0.5 ms.

Figure 12A:
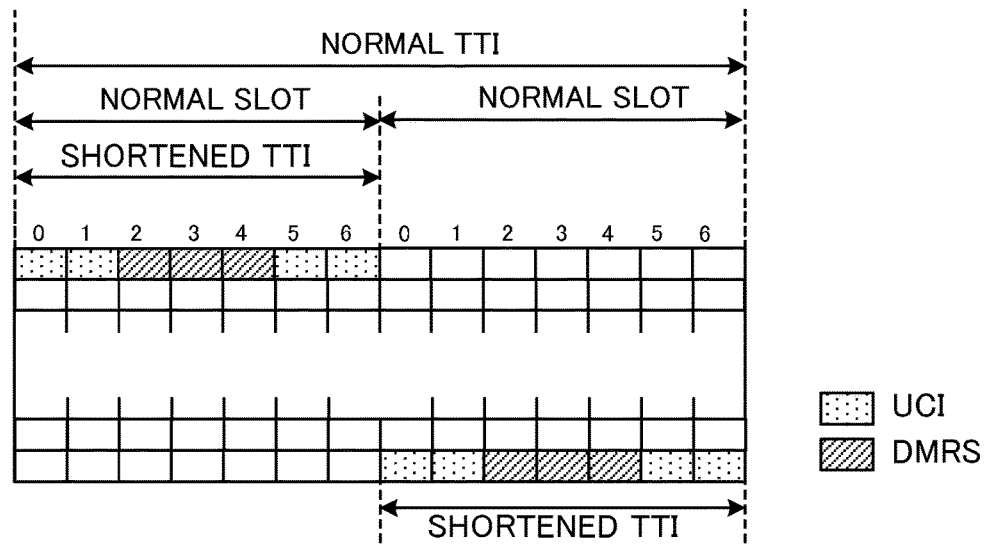
FIGS. 12A and 12B are diagrams illustrating a first arrangement example based on PFs 1/1a/1b/3 according to a second embodiment.

FIG. 12A illustrates an application example of the PFs 1/1a/1b with respect to each shortened TTI of 0.5 ms. In FIG. 12A, CS spreading (phase rotation) that uses a CS sequence of the sequence length 12 and orthogonal spreading (time spreading) that uses an orthogonal sequence of the sequence length 4 are applied to four information symbols in each shortened TTI (i.e. a spreading code of a spreading factor 48 is applied). Further, phase rotation that is determined as a function of a PUCCH resource index according to the PFs 1/1a/1b/3 by using a CAZAC (Constant Amplitude Zero Auto-Correlation) sequence defined for one PRB, and an orthogonal spreading code of a sequence length 3 are applied to three DMRS symbols. It is possible to apply to the three DMRS symbols the orthogonal spreading code of the sequence length 3 that is determined according to the function of the PUCCH resource index, and it is also possible to improve orthogonality between signals of user terminals multiplexed on the identical PRB.

Figure 12B:
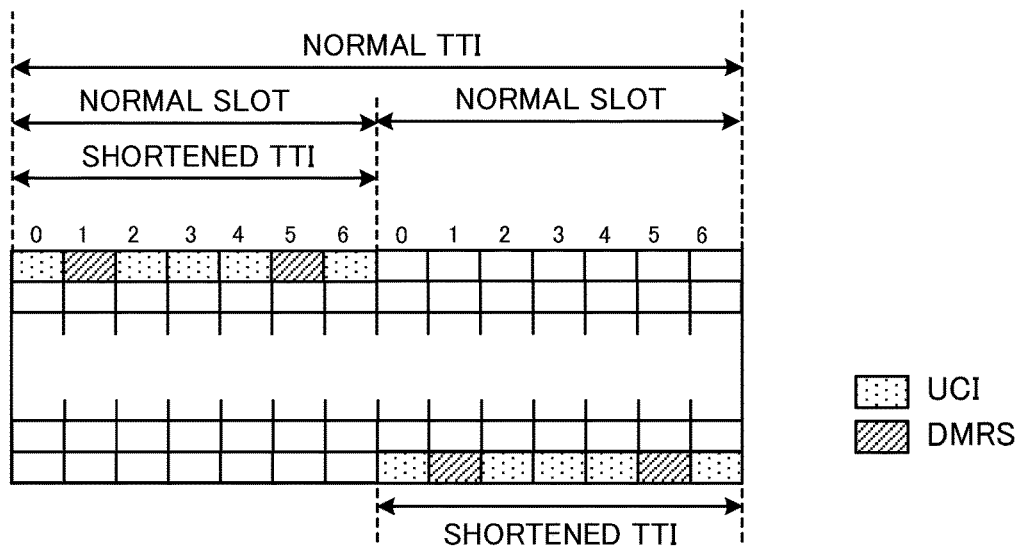

FIG. 12B illustrates an application example of the PF 3 with respect to each shortened TTI of 0.5 ms. In FIG. 12B, orthogonal spreading (time spreading) that uses an orthogonal sequence of a sequence length 5 is applied to five information symbols in each shortened TTI (i.e. a spreading code of a spreading factor 5 is applied). Meanwhile, a signal obtained by applying phase rotation determined as the function of the PUCCH resource index of the PF 3 to the CAZAC sequence fined for one PRB is mapped on two DMRS symbols. In this regard, it is possible to apply to two DMRS symbols the orthogonal spreading code of the sequence length 2 determined according to the function of the PUCCH resource index, and improve orthogonality between signals of the user terminals multiplexed on the identical PRB.

According to the first arrangement example based on PFs 1/1a/1b/3, it is possible to use the existing PFs 1/1a/1b/3 and appropriate a generation circuit of an existing PF by permitting only shortened TTIs of 0.5 ms without introducing a new PF. Consequently, it is possible to provide a latency reduction effect provided by introducing shortened TTIs of 0.5 ms without applying a new design load.

<Second Arrangement Example Based on PFs 1/1a/1b/3>

When each shortened TTI is configured by a smaller number of symbols (e.g. four symbols) than that of each normal slot as described with reference to FIG. 5B, it is assumed that the existing PFs 1/1a/1b/3 cannot maintain orthogonality of spreading codes in the time direction. Meanwhile, by introducing the orthogonal spreading codes of a sequence length corresponding to the number of symbols in each shortened TTI, it is possible to maintain orthogonality of the spreading codes in the time direction even when each shortened TTI is configured by a smaller number of symbols than that of each normal slot.

Hence, a spreading code of a sequence length corresponding to the number of information symbols (or the number of DMRS symbols) in each shortened TTI may be introduced for each shortened TTI having a different number of symbols from that of each normal slot. FIG. 13 are diagrams illustrating a second arrangement example based on the PFs 1/1a/1b according to the second embodiment. As illustrated in FIG. 13, the second arrangement example permits each shortened TTI having a different number of symbols from that of each normal slot, too.

Figure 13A:
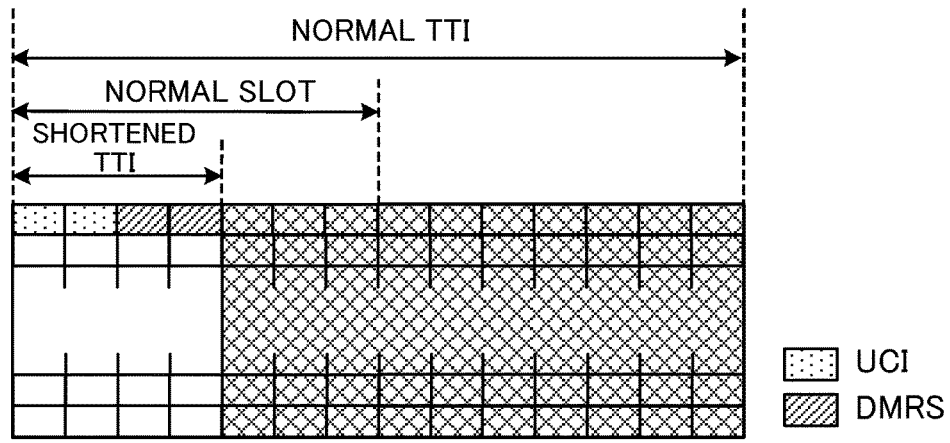
FIGS. 13A and 13B are diagrams illustrating a second arrangement example based on the PFs 1/1a/1b/3 according to the second embodiment.

FIG. 13A illustrates an application example of the PFs 1/1a/1b with respect to each shortened TTI configured by four symbols. In FIG. 13A, CS spreading (phase rotation) that uses a CS sequence of the sequence length 12 and orthogonal spreading (time spreading) that uses an orthogonal sequence of the sequence length 2 are applied to two information symbols in each shortened TTI (i.e., a spreading code of a spreading factor of 24 is applied). Further, phase rotation that uses a CAZAC sequence defined for one PRB and is determined as a function of a PUCCH resource index according to the PFs 1/1a/1b is applied to two DMRS symbols. It is also possible to apply to the two DMRS symbols an orthogonal spreading code of the sequence length 2 that is determined according to the function of the PUCCH resource index, and improve orthogonality between signals of the user terminals multiplexed on an identical PRB.

Figure 13B:
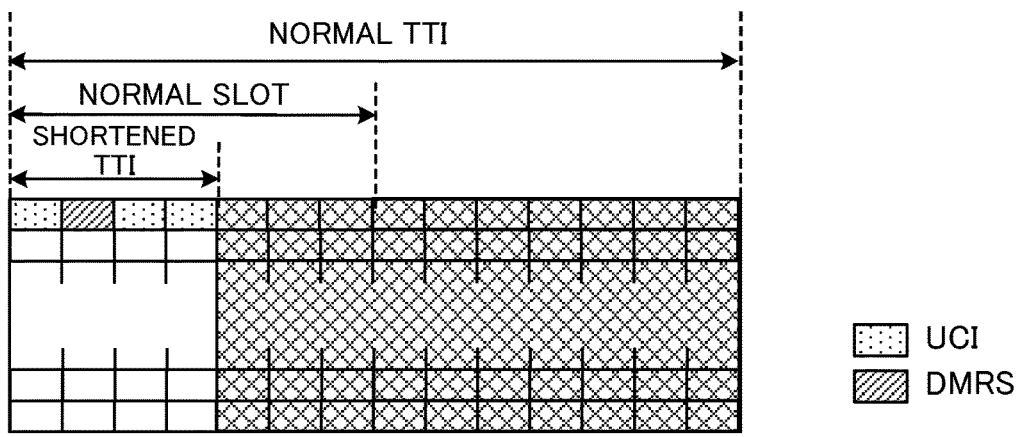

FIG. 13B illustrates an application example of the PF 3 with respect to each shortened TTI configured by four symbols. In FIG. 13B, orthogonal spreading (time spreading) that uses an orthogonal sequence of the sequence length 3 is applied to three information symbols in each shortened TTI (i.e., a spreading code of a spreading code 3 is applied). Meanwhile, a signal obtained by applying phase rotation that is determined as the function of the PUCCH resource index of the PF 3 for the CAZAC sequence defined for one PRB is mapped on one DMRS symbol.

In this regard, FIG. 13 illustrate the application examples of PFs 1/1a/1b/3 with respect to each shortened TTI configured by the four symbols. However, the number of symbols that configure each shortened TTI is not limited to this and can be optionally changed and applied. The number of symbols that configure each shortened TTI needs to be different from the number of symbols that configure each normal slot, and may be smaller or greater.

When, for example, each shortened TTI is configured by three symbols in FIG. 13A, only CS spreading that uses a CS sequence of the code length 12 may be applied to one DMRS symbol (i.e. the spreading code of the spreading factor 12 may be applied). Further, when each shortened TTI is configured by three symbols in FIG. 13B, orthogonal spreading (time spreading) that uses an orthogonal sequence of the sequence length 2 may be applied to two information symbols (i.e. a spreading code of the spreading factor 2 may be applied).

Thus, according to the second arrangement example based on the PFs 1/1a/1b/3, a sequence length (a spreading factor and a code length) of a spreading code multiplied on information symbols is changed according to the number of information symbols in each shortened TTI. Consequently, even when each shortened TTI is configured by a different number of symbols from that of each normal slot, it is possible to maintain orthogonality in the time direction and multiplex signals of a plurality of user terminals on an identical PRB. As a result, it is possible to reduce an overhead of a PUCCH.

Figure 14A:
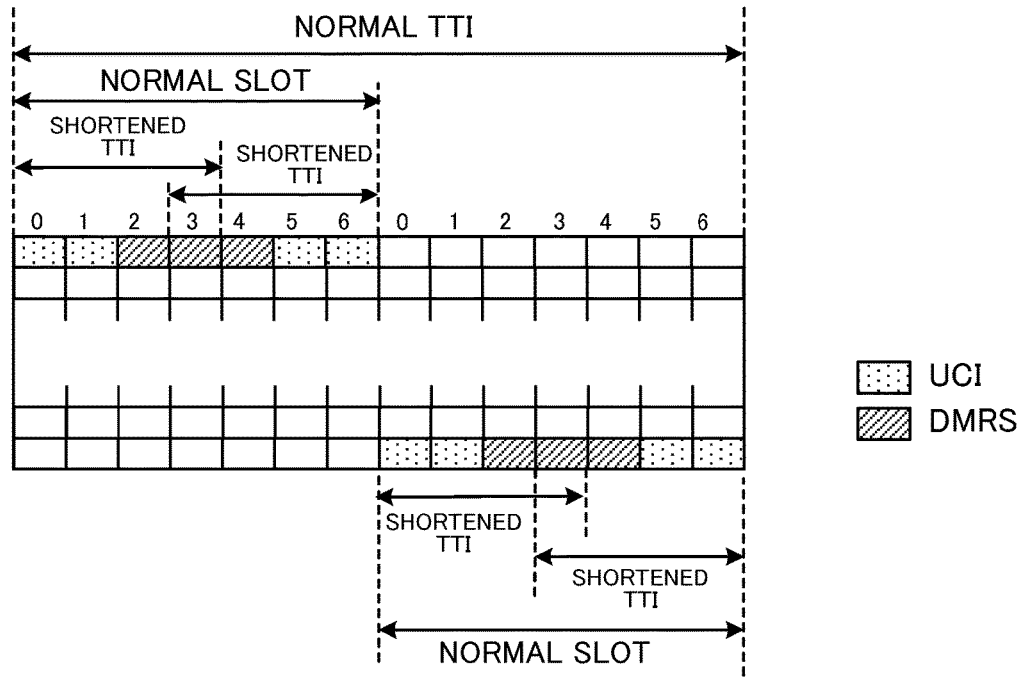
FIGS. 14A and 14B are diagrams illustrating configuration examples of shortened TTIs in a second arrangement example based on the PFs 1/1a/1b/3 according to the second embodiment.
Figure 14B:
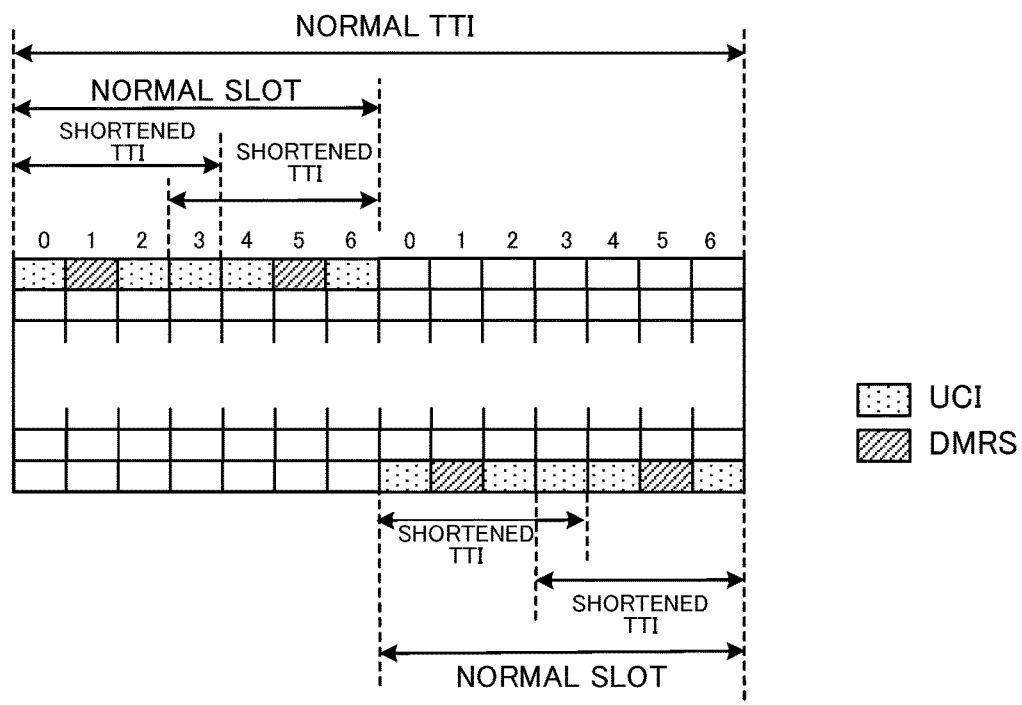

FIG. 14 are diagrams illustrating configuration examples of shortened TTIs according to the second arrangement example based on the PFs 1/1a/1b/3. As illustrated in FIGS. 14A and 14B, all shortened TTIs in each normal slot may be configured by four symbols. FIG. 14A illustrates the configuration example of each shortened TTI based on the PFs 1/1a/1b, and FIG. 14B illustrates the configuration example of each shortened TTI based on the PF 3.

In a case of the PFs 1/1a/1b, a DMRS symbol (symbol #3) is shared between the former and latter shortened TTIs in each normal slot as illustrated in FIG. 14. More specifically, even when transmitting a PUCCH by using one of the former and latter shortened TTIs in each normal slot, the user terminal transmits the DMRS by using the symbol #3.

The DMRSs of the former and latter shortened TTIs may be multiplexed on the symbol #3 in FIG. 14A by Cyclic Shift (CS) or Comb. More specifically, CS sequences of different CS indices may be multiplied on the DMRSs of the former and latter shortened TTIs. Alternatively, different types of Comb may be allocated to the DMRSs of the former and latter shortened TTIs.

Meanwhile, in a case of the PF 3, an information symbol (symbol #3) is shared between the former and latter shortened TTIs in each normal slot as illustrated in FIG. 14B. More specifically, even when transmitting the PUCCH by using one of former and latter shortened TTIs in each normal slot, the user terminal transmits UCI by using the symbol #3. Pieces of UCI of the former and latter shortened TTIs may be multiplexed on the symbol #3 in FIG. 14B by Comb.

Figure 15A:
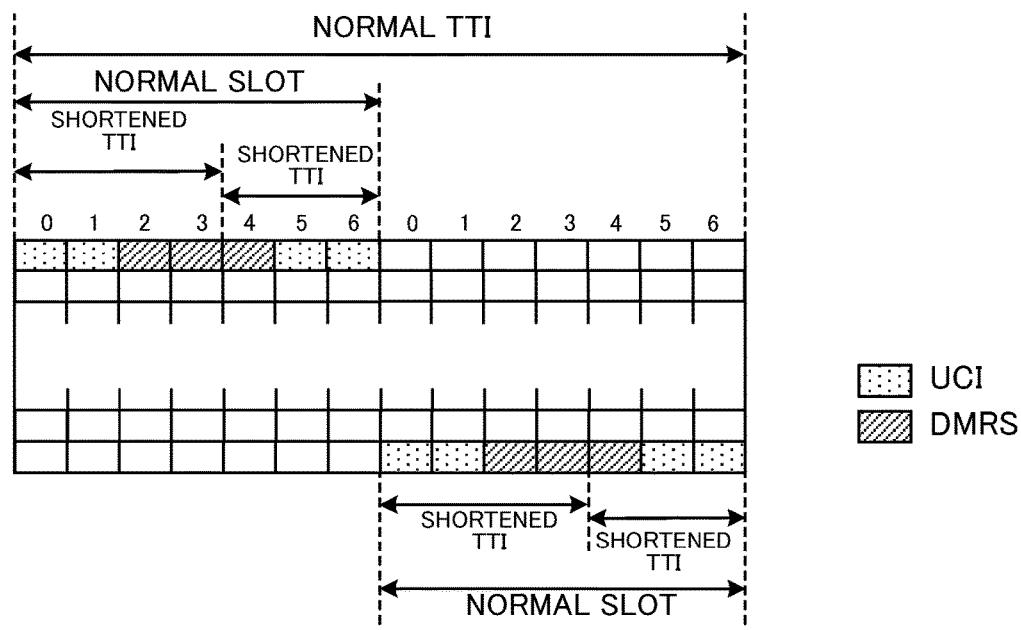
FIGS. 15A and 15B are diagrams illustrating other configuration examples of shortened TTIs in the second arrangement example based on the PFs 1/1a/1b/3.
Figure 15B:
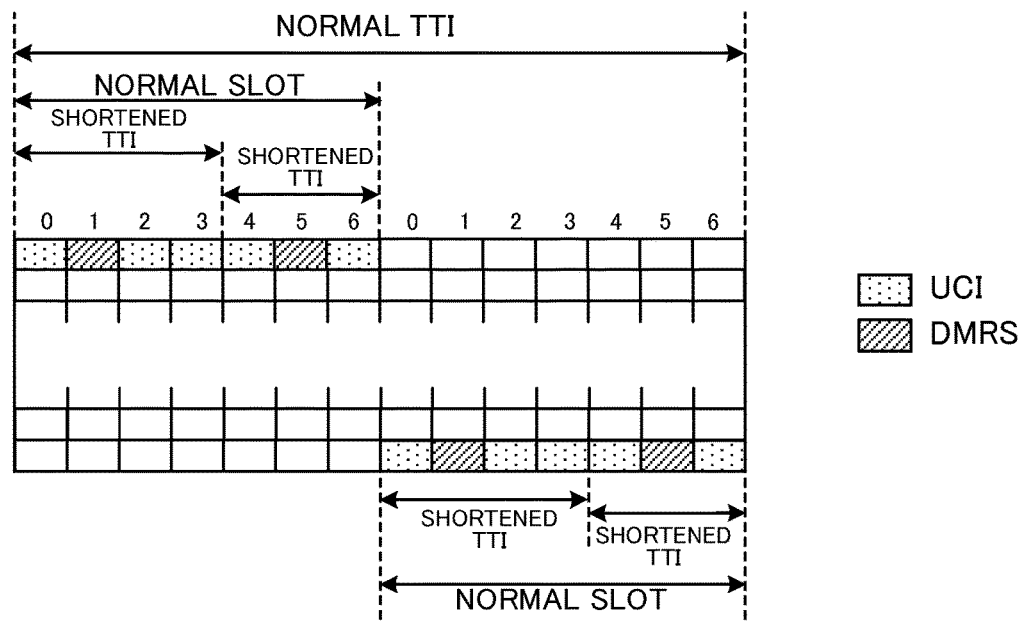

FIG. 15 are diagrams illustrating other configuration examples of shortened TTIs according to the second arrangement example based on the PFs 1/1a/1b/3. As illustrated in FIGS. 15A and 15B, each shortened TTI in each normal TTI may be configured by three or four symbols. FIG. 15A illustrates the configuration example of each shortened TTI based on the PFs 1/1a/1b, and FIG. 15B illustrates the configuration example of each shortened TTI based on the PF 3.

In the case of the PFs 1/1a/1b, as illustrated in FIG. 15A, the former shortened TTI in each normal slot includes two information symbols and two DMRS symbols. Meanwhile, the latter shortened TTI includes two information symbols and one DMRS symbol. In FIG. 15A, the numbers of DMRS symbols differ between the former and latter shortened TTIs, and therefore spreading codes of different sequence lengths (spreading factors) may be applied to the DMRSs of the former and latter shortened TTIs.

For example, in FIG. 15A, CS spreading that uses a CS sequence of the sequence length 12 and orthogonal spreading that uses an orthogonal sequence of the sequence length 2 are applied to the DMRS of the former shortened TTI (i.e., a spreading code of a spreading code 24 is applied). Meanwhile, only CS spreading that uses a CS sequence of the code length 12 is applied to the DMRS of the latter shortened TTI (i.e., a spreading code of the spreading code 12 is applied).

Meanwhile, in a case of the PF 3, as illustrated in FIG. 15B, the former shortened TTI in each normal slot includes three information symbols and one DMRS symbol. Meanwhile, the latter shortened TTI includes two information symbols and one DMRS symbol. In FIG. 15B, the numbers of information symbols differ between the former and latter shortened TTIs, and therefore spreading codes of different sequence lengths (spreading factors) may be applied to pieces of UCI of the former and latter shortened TTIs.

For example, in FIG. 15B, orthogonal spreading that uses an orthogonal sequence of the sequence length 3 is applied to the UCI of the former shortened TTI (i.e., a spreading code of the spreading factor 3 is applied). Meanwhile, orthogonal spreading that uses an orthogonal sequence of the sequence length 2 is applied to the UCI of the latter shortened TTI (i.e., a spreading code of the spreading factor 2 is applied).

In this regard, in FIGS. 15A and 15B, the former shortened TTI in each normal slot is configured by four symbols and the latter shortened TTI is configured by three symbols. However, the former shortened TTI may be configured by three symbols, and the latter shortened TTI may be configured by four symbols.

<Arrangement Example Based on PFs 2/2a/2b/4/5>

As described with reference to FIGS. 6B and 6C, when the existing the PFs 2/2a/2b/4/5 are applied to each shortened TTI, a payload is changed according to the number of information symbols in each shortened TTI. Meanwhile, the PFs 2/2a/2b/4/5 do not cause a problem of orthogonality in the time direction unlike the PFs 1/1a/1b/3, and therefore can be applied to both of each shortened TTI having the same number of symbols as that of each normal slot, and each shortened TTI having a different number of symbols from that of the normal slot.

FIG. 16 are diagrams illustrating arrangement examples based on the PFs 2/2a/2b/4/5 according to the second embodiment. FIG. 16 illustrate each shortened TTI configured by a smaller number of symbols than that of the normal slot. However, this arrangement example is applicable to each shortened TTI having the same number of symbols than that of the normal slot, too.

Figure 16A:
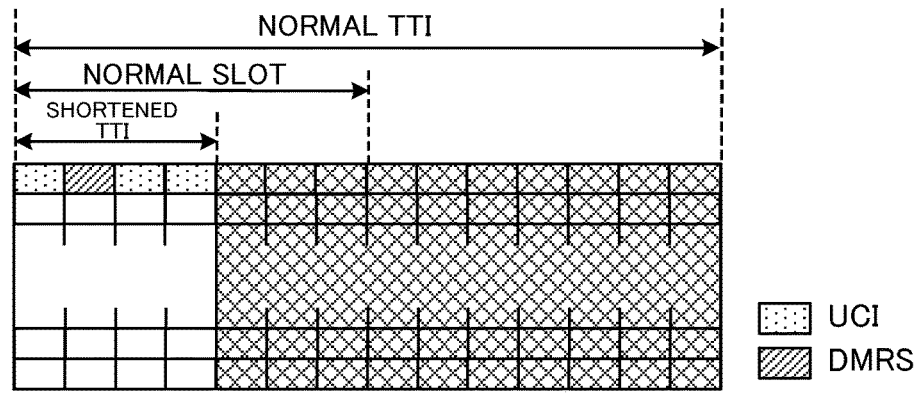
FIGS. 16A to 16C are diagrams illustrating arrangement examples based on PFs 2/2a/2b/4/5 according to the second embodiment.

FIG. 16A illustrates an application example of the PFs 2/2a/2b with respect to each shortened TTI configured by four symbols. In FIG. 16A, different pieces of UCI are mapped on three information symbols in each shortened TTI, respectively, and CS spreading (phase rotation) that uses a CS sequence of the sequence length 12 is applied to an identical information symbol (i.e., a spreading code of the spreading factor 12 is applied). Further, phase rotation that is determined as the function of the PUCCH resource index of the PF 2 or a function of HARQ-ACK to be multiplexed for a CAZAC sequence for one PRB is applied to one DMRS symbol in each shortened TTI.

Figure 16B:
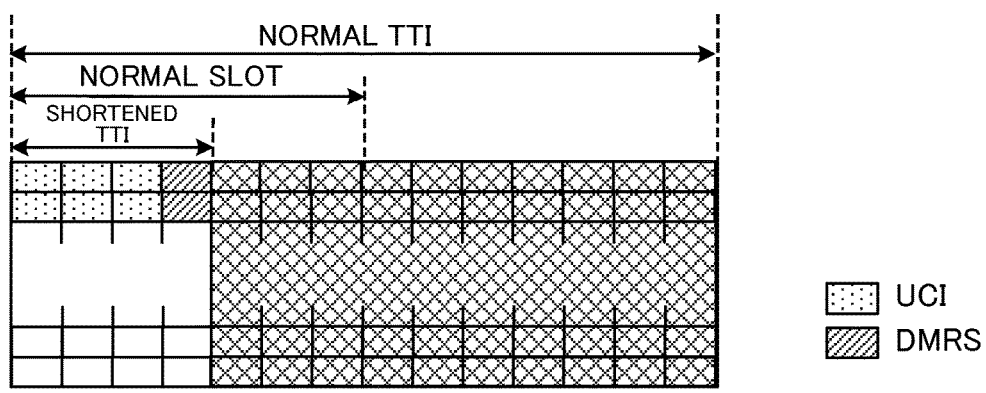

FIG. 16B illustrates an application example of the PF 4 with respect to each shortened TTI configured by four symbols. In FIG. 16B, different pieces of UCI are mapped on three information symbols in each shortened TTI of each PRB, respectively, and is not spread. Further, one DMRS symbol in each shortened is not spread, either.

Figure 16C:
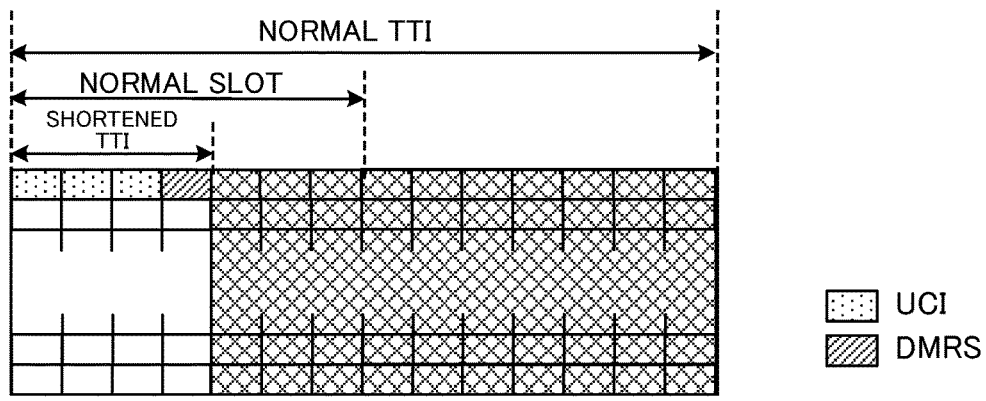

FIG. 16C illustrates an application example of the PF 5 with respect to each shortened TTI configured by four symbols. In FIG. 16C, different pieces of UCI are mapped on three information symbols in each shortened TTI, respectively, and CS spreading (phase rotation) that uses a CS sequence of the sequence length 12 is applied to the identical information symbol (a maximum spreading factor is 2). Further, phase rotation that is determined as a function of a PUCCH resource index of the PF 5 for the CAZAC sequence for one PRB is applied to one DMRS symbol in each shortened TTI.

As illustrated in FIGS. 16A and 16C, when the PFs 2/2a/2b/5 are applied to each shortened TTI, it is possible to spread and multiplex signals of the user terminals similar to a case where the PFs 2/2a/2b/5 are applied to each normal TTI. Further, when the PF 4 is applied to each shortened TTI as illustrated in FIG. 16B, it is possible to use a plurality of PRBs similar to a case where the PF 4 is applied to each normal TTI.

Figure 17A:
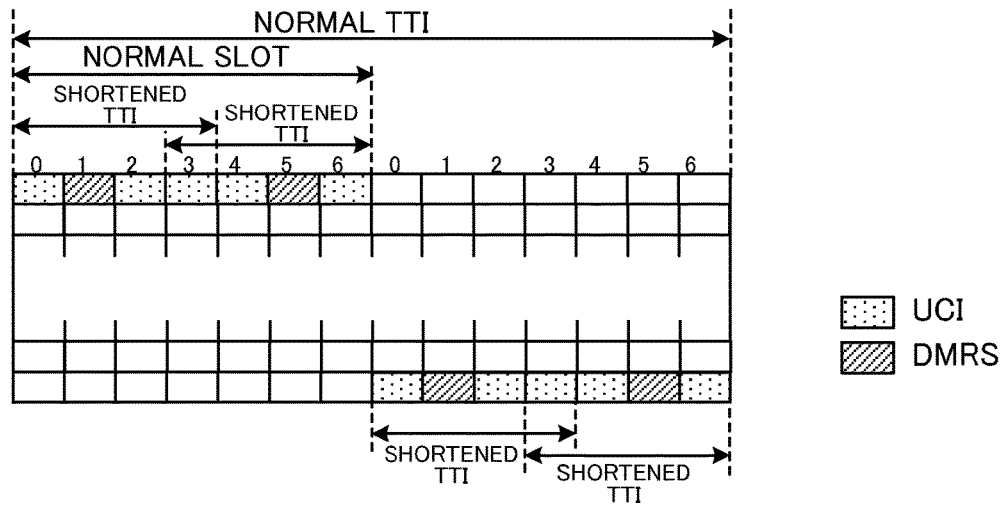
FIGS. 17A to 17C are diagrams illustrating configuration examples of shortened TTIs in the arrangement examples based on the PFs 2/2a/2b/4/5.
Figure 17B:
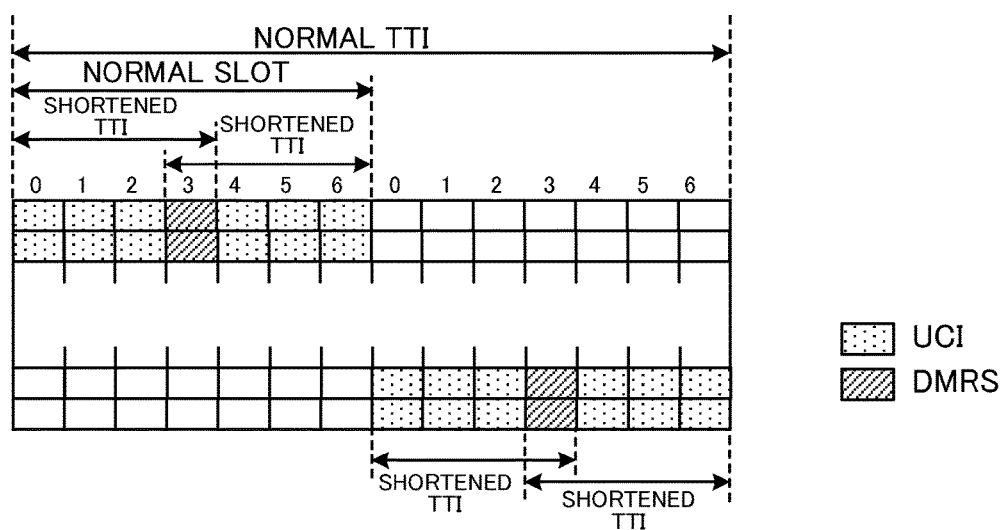
Figure 17C:
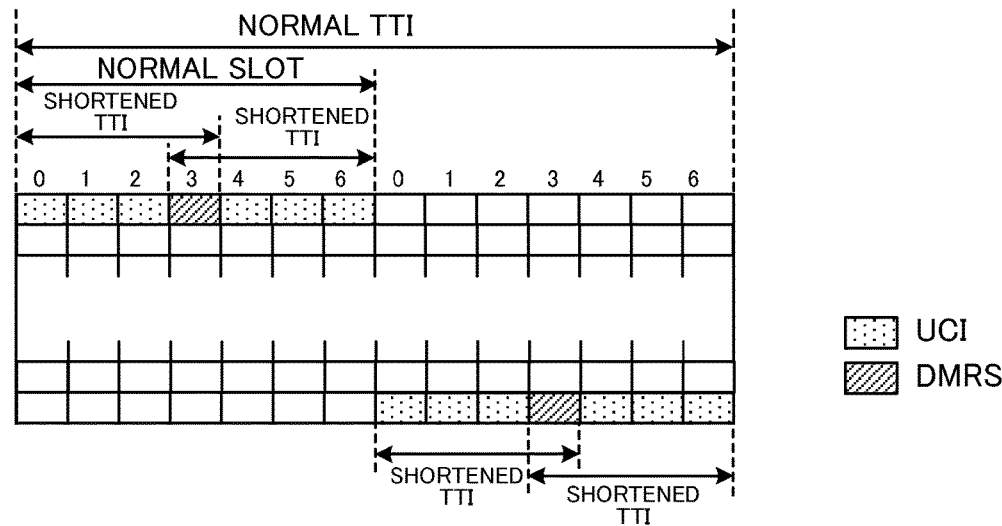

FIG. 17 are diagrams illustrating configuration examples of shortened TTIs according to arrangement examples based on the PFs 2/2a/2b/4/5. As illustrated in FIGS. 17A to 17C, all shortened TTI in each normal TTI may be configured by four symbols. FIG. 17A illustrates the arrangement examples based on the PFs 2/2a/2b, FIG. 17B illustrates the arrangement example based on the PF 4, and FIG. 17C illustrates the arrangement example based on the PF 5.

In a case of the PFs 2/2a/2b, as illustrated in FIG. 17A, an information symbol (symbol #3) is shared between the former and latter shortened TTIs in each normal slot. More specifically, even when transmitting a PUCCH by using one of the former and latter shortened TTI in each normal slot, the user terminal transmits UCI by using the symbol #3. The pieces of UCI of the former and latter shortened TTIs may be multiplexed on the symbol #3 in FIG. 17A by Comb.

Meanwhile, in a case of the PFs 4 and 5, as illustrated in FIGS. 17B and 17C, a DMRS symbol (symbol #3) is shared between the former and latter shortened TTIs in each normal slot. More specifically, even when transmitting a PUCCH by using one of the former and latter shortened TTI in each normal slot, the user terminal transmits the DMRS by using the symbol #3.

The DMRSs of the former and latter shortened TTIs may be multiplexed on the symbol #3 in FIGS. 17B and 17C by Cyclic Shift (CS) or Comb. More specifically, CS sequences of different CS indices may be multiplied on the DMRSs of the former and latter shortened TTIs. Alternatively, different Comb may be allocated to the DMRSs of the former and latter shortened TTIs.

Figure 18A:
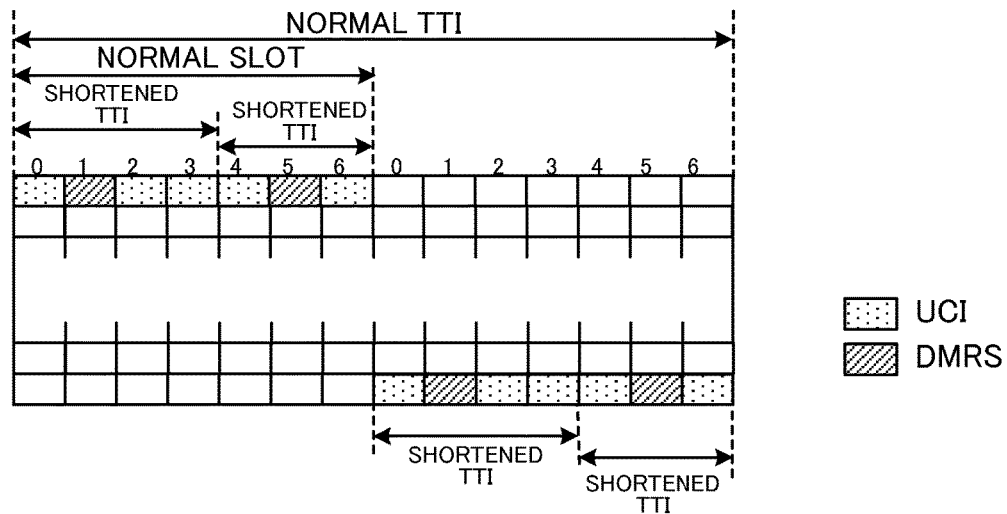
FIGS. 18A to 18C are diagrams illustrating other configuration examples of shortened TTIs in the arrangement examples based on the PFs 2/2a/2b/4/5.
Figure 18B:
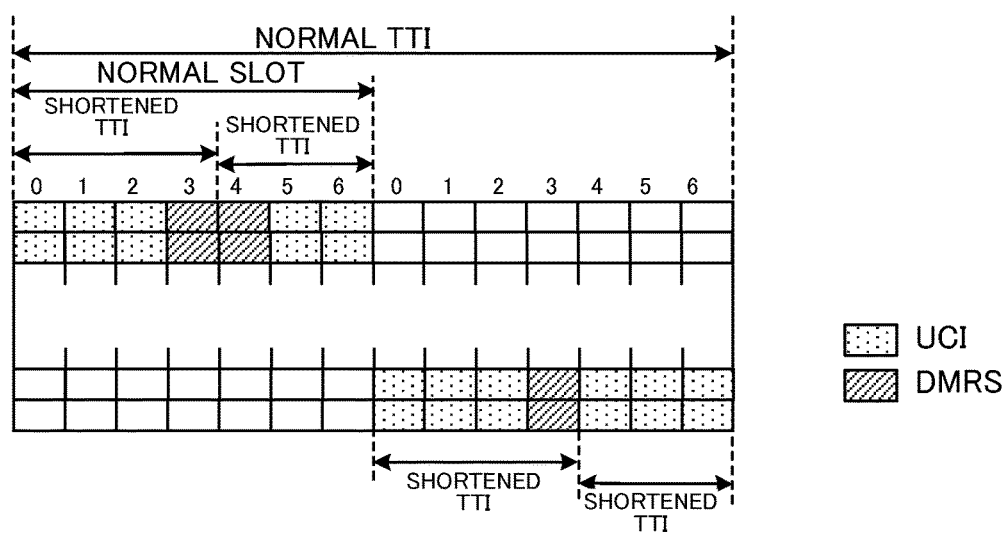
Figure 18C:
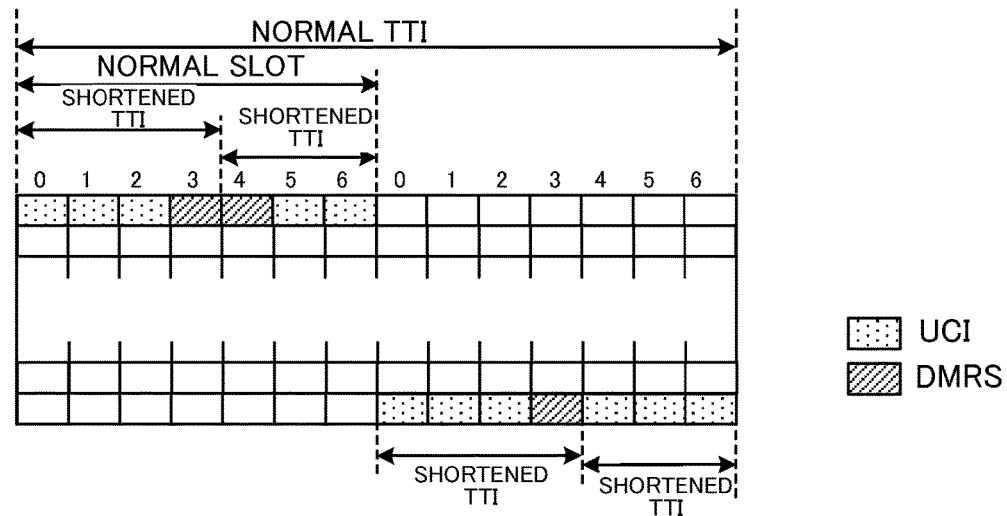

FIG. 18 are diagrams illustrating other configuration examples of shortened TTIs according to the arrangement examples based on the PFs 2/2a/2b/4/5. As illustrated in FIGS. 18A to 18C, each shortened TTI in each normal TTI may be configured by three or four symbols. FIG. 18A illustrates the arrangement examples based on the PFs 2/2a/2b, FIG. 18B illustrates the arrangement example based on the PF 4, and FIG. 18C illustrates the arrangement example based on the PF 5.

In the case of the PFs 2/2a/2b, as illustrated in FIG. 18A, the former shortened TTI in each normal slot includes three information symbols and one DMRS symbol. Meanwhile, the latter shortened TTI includes two information symbols and one DMRS symbol. In FIG. 18A, the numbers of information symbols differ between the former and latter shortened TTIs, and therefore payloads of the pieces of UCI differ between the former and latter shortened TTIs.

Meanwhile, in the case of the PFs 4/5, as illustrated in FIGS. 18B/18C, the former shortened TTI in each normal slot includes three information symbols and one DMRS symbol. Meanwhile, the latter shortened TTI does not include a DMRS symbol when the PFs 4/5 are applied as is, and therefore the symbol #4 may be changed from an information symbol to a DMRS symbol. Consequently, the latter shortened TTI also includes a DMRS symbol, so that it is possible to appropriately demodulate (channel estimation) the UCI of the latter shortened TTI.

In this regard, in FIG. 18, the former shortened TTI in each normal slot is configured by four symbols and the latter shortened TTI is configured by three symbols. However, the former shortened TTI may be configured by three symbols, and the latter shortened TTI may be configured by four symbols.

As described above, according to the second embodiment, the existing PUCCH formats are applied to each shortened TTI, so that it is possible to reduce a design load for providing a latency reduction effect provided by introducing each shortened TTI.

In this regard, the second embodiment may permit only shortened TTIs having the same number of symbols (e.g. seven symbols in the case of normal CP and six symbols in the case of enhanced CP) as that of each normal slot in the case of the PFs 1/1a/1b/3, and may permit the shortened TTIs having a smaller number of symbols (e.g. three or four symbols) than that of each normal slot in the case of the PFs 2/2a/2b/4/5. In this case, the user terminal to which each shortened TTI is configured may transmit each shortened TTI having the same number of symbols as that of each normal slot when performing transmission using the PFs 1/1a/1b/3, and may transmit each shortened TTI having a smaller number of symbols than that of each normal slot when performing transmission using the PFs 2/2a/2b/4/5.

Alternatively, the user terminal that transmits each shortened TTI having a smaller number of symbols than that of each normal slot may perform transmission using one of the PFs 2/2a/2b/4/5 irrespectively of contents of UCI (such as SR, HARQ-ACK and CQI). In this case, when a PUCCH having a predetermined TTI length is transmitted instead of changing a PF to be applied according to contents of UCI as conventionally performed, a predetermined PF may be used irrespectively of the contents of the UCI.

Third Embodiment

Conditions for transmitting a PUCCH by using each shortened TTI will be described in the third embodiment. In this regard, the third embodiment may be combined with one of the first and second embodiment. In the third embodiment, a user terminal may determine to transmit a PUCCH by using each shortened TTI under, for example, one of following conditions (1) to (3).

(1) When transmitting a PUCCH by using each shortened TTI by higher layer signaling and configuring a TTI length of each shortened TTI, the user terminal may transmit the PUCCH by using each shortened TTI at all times. In this case, the user terminal transmits the PUCCH by using each shortened TTI irrespectively of the conditions and, consequently, can maximize the latency reduction effect.

Alternatively, when transmitting a PUCCH by using each shortened TTI by higher layer signaling and configuring a TTI length of each shortened TTI, and scheduling a PDSCH by using each shortened TTI, the user terminal may transmit the PUCCH by using each shortened TTI. In this case, it is possible to fall back a PUCCH to the PUCCH of each normal TTI in environment in which a PDSCH of each normal TTI is scheduled, and prevent deterioration of connection quality.

Alternatively, (3) when transmitting a PUCCH by using each shortened TTI by higher layer signaling and configuring a TTI length of each shortened TTI, and detecting a L1/L2 control signal (e.g. PDCCH) for scheduling a PDSCH by using each shortened TTI, the user terminal may transmit the PUCCH by using each shortened TTI. In this case, it is possible to prevent deterioration of connection quality similar to the condition (2) and easily perform control for demultiplexing carriers for transmitting and receiving a control channel and a data channel when cross-carrier scheduling is applied.

(Radio Communication System)

A configuration of a radio communication system according to one embodiment of the present invention will be described below. The radio communication method according to each of the above embodiments is applied to this radio communication system. In this regard, a radio communication method according to each of the embodiments may be applied alone or may be applied in combination.

Figure 19:
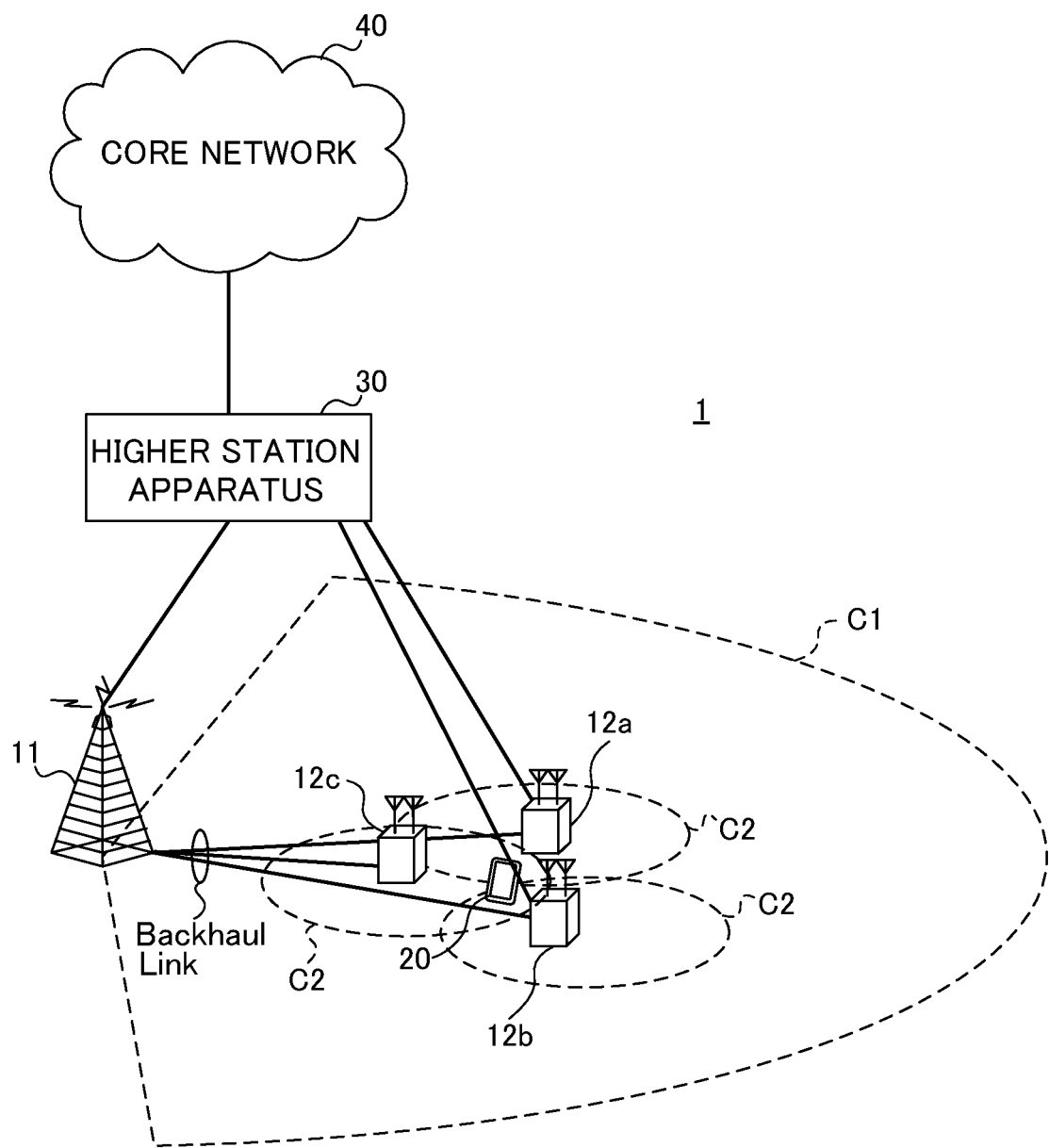
FIG. 19 is a diagram illustrating an example of a schematic configuration of a radio communication system according to the present embodiment.

FIG. 19 is a diagram illustrating an example of a schematic configuration of the radio communication system according to the present embodiment. In a radio communication system 1, it is possible to apply Carrier Aggregation (CA) to aggregate a plurality of base frequency blocks (component carriers) whose one unit is a system bandwidth (e.g. 20 MHz) of an LTE system, and/or Dual Connectivity (DC). In this regard, the radio communication system 1 may be referred to as SUPER 3G, LTE-A (LTE-Advanced), IMT-Advanced, 4G, 5G, and FRA (Future Radio Access).

The radio communication system 1 illustrated in FIG. 19 includes a radio base station 11 that forms a macro cell C1, and radio base stations 12a to 12c that are located in the macro cell C1 and form small cells C2 narrower than the macro cell C1. Further, a user terminal 20 is located in the macro cell Cl and each small cell C2.

The user terminal 20 can connect to both of the radio base station 11 and the radio base stations 12. The user terminal 20 is assumed to concurrently use the macro cell C1 and the small cells C2 that use different frequencies according to CA or DC. Further, the user terminal 20 can apply CA or DC by using a plurality of cells (CCs) (e.g. six or more CCs).

The user terminal 20 and the radio base station 11 can communicate by using a carrier (an existing carrier that is called Legacy carrier) of a narrow bandwidth in a relatively low frequency band (e.g. 2 GHz). Meanwhile, the user terminal 20 and each radio base station 12 may use a carrier of a wide bandwidth in a relatively high frequency band (e.g. 3.5 GHz or 5 GHz) or may use the same carrier as that used by the radio base station 11. In this regard, a configuration of a frequency band used by each radio base station is not limited to this.

The radio base station 11 and each radio base station 12 (or the two radio base stations 12) can be configured to be connected by wires (e.g. optical fibers compliant with a CPRI (Common Public Radio Interface) or an X2 interface) or by radio.

The radio base station 11 and each radio base station 12 are connected to a higher station apparatus 30 and are connected to a core network 40 via the higher station apparatus 30. In this regard, the higher station apparatus 30 includes, for example, an access gateway apparatus, a Radio Network Controller (RNC), a Mobility Management Entity (MME) and the like, yet is not limited thereto. Further, each radio base station 12 may be connected to the higher station apparatus 30 via the radio base station 11.

In this regard, the radio base station 11 is a radio base station having relatively wide coverage, and may be referred to as a macro base station, an aggregate node, an eNB (eNodeB) and a transmission/reception point. Further, each radio base station 12 is a radio base station having local coverage, and may be referred to as a small base station, a micro base station, a pico base station, a femto base station, a HeNB (Home eNodeB), a RRH (Remote Radio Head) and a transmission/reception point. The radio base stations 11 and 12 will be collectively referred to as the radio base station 10 unless distinguished below.

Each user terminal 20 is a terminal that supports various communication schemes such as LTE and LTE-A, and may include not only a mobile communication terminal but also a fixed communication terminal.

The radio communication system 1 applies OFDMA (Orthogonal Frequency-Division Multiple Access) to downlink and SC-FDMA (Single Carrier Frequency Division Multiple Access) to uplink as radio access schemes. OFDMA is a multicarrier transmission scheme of dividing a frequency band into a plurality of narrow frequency bands (subcarriers), mapping data on each subcarrier and performing communication. SC-FDMA is a single carrier transmission scheme of dividing a system bandwidth into a band configured by one or continuous resource blocks per terminal, using different bands for a plurality of terminals and reducing an interference between terminals. In this regard, uplink and downlink radio access schemes are not limited to a combination of these, and OFDMA may be used for uplink.

The radio communication system 1 uses a downlink shared channel (PDSCH: Physical Downlink Shared Channel), a broadcast channel (PBCH: Physical Broadcast Channel), and a downlink L1/L2 control channel shared by each user terminal 20 as downlink channels. User data, higher layer control information and a SIB (System Information Block) are transmitted on the PDSCH. Further, a MIB (Master Information Block) is transmitted on the PBCH.

The downlink L1/L2 control channel includes downlink control channels (a PDCCH (Physical Downlink Control Channel) and an EPDCCH (Enhanced Physical Downlink Control Channel)), a PCFICH (Physical Control Format Indicator Channel), and a PHICH (Physical Hybrid-ARQ Indicator Channel). Downlink Control Information (DCI) including scheduling information of the PDSCH and the PUSCH is transmitted on the PDCCH. The number of OFDM systems used for the PDCCH is transmitted on the PCFICH. Transmission acknowledgement information (ACK/NACK) of HARQ for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel), an uplink control channel (PUCCH: Physical Uplink Control Channel), and a random access channel (PRACH: Physical Random Access Channel) shared by each user terminal 20 as uplink channels. User data and higher layer control information are transmitted on the PUSCH. Uplink Control Information (UCI) including at least one of transmission acknowledgement information (ACK/NACK) and radio quality information (CQI) is transmitted on the PUSCH or the PUCCH. A random access preamble for establishing connection with cells is transmitted on the PRACH.

<Radio Base Station>

Figure 20:
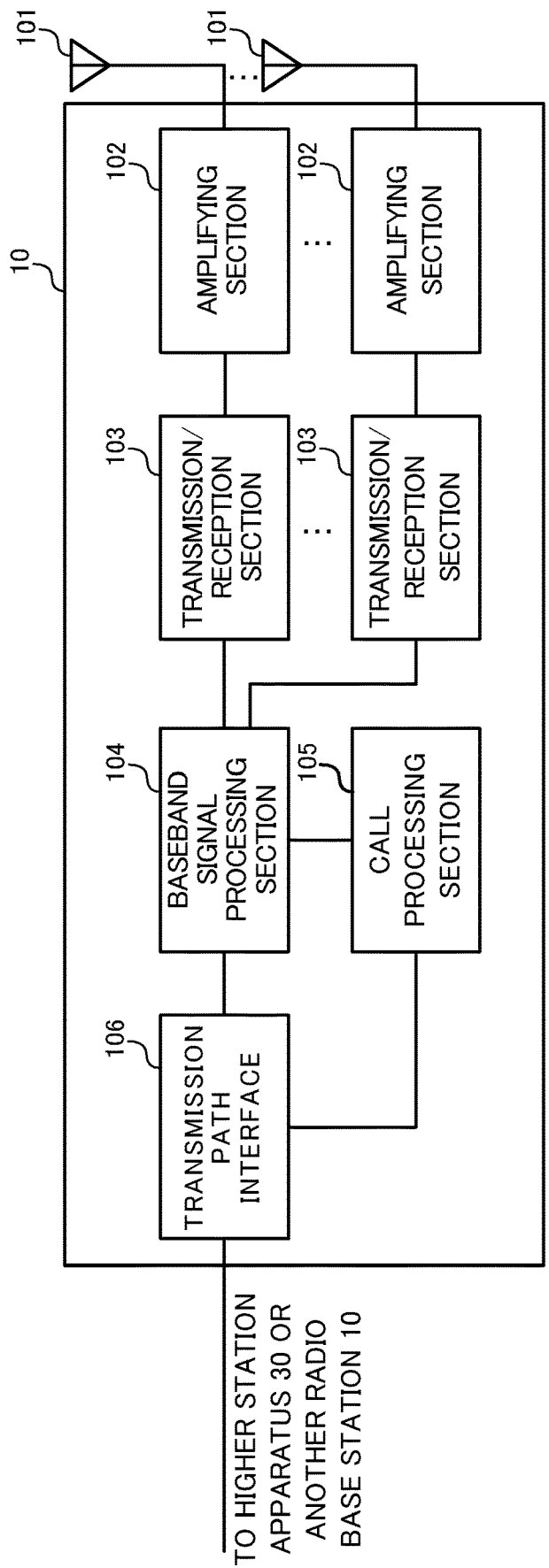
FIG. 20 is a diagram illustrating an example of an entire configuration of a radio base station according to the present embodiment.

FIG. 20 is a diagram illustrating an example of an entire configuration of the radio base station according to the present embodiment. The radio base station 10 includes a plurality of transmission/reception antennas 101, amplifying sections 102, transmission/reception sections 103, a baseband signal processing section 104, a call processing section 105, and a transmission path interface 106. In this regard, the radio base station 10 needs to be configured to include one or more transmission/reception antennas 101, amplifying sections 102 and transmission/reception sections 103.

User data transmitted from the radio base station 10 to the user terminal 20 on downlink is input from the higher station apparatus 30 to the baseband signal processing section 104 via the transmission path interface 106.

The baseband signal processing section 104 performs processing of a PDCP (Packet Data Convergence Protocol) layer, segmentation and concatenation of the user data, transmission processing of a RLC (Radio Link Control) layer such as RLC retransmission control, and MAC (Medium Access Control) retransmission control (such as HARQ (Hybrid Automatic Repeat reQuest) transmission processing), and transmission processing such as scheduling, transmission format selection, channel coding, Inverse Fast Fourier Transform (IFFT) processing, and precoding processing on the user data to transfer to each transmission/reception section 103. Further, the baseband signal processing section 104 performs transmission processing such as channel coding and inverse fast Fourier transform on a downlink control signal, too, to transfer to each transmission/reception section 103.

Each transmission/reception section 103 converts a baseband signal precoded and output per antenna from the baseband signal processing section 104, into a signal of a radio frequency band. Each amplifying section 102 amplifies the radio frequency signal subjected to frequency conversion by each transmission/reception section 103, and transmits the radio frequency signal from the transmission/reception antennas 101.

The transmission/reception sections 103 can be composed of a transmitter/receiver, a transmission/reception circuit or a transmission/reception apparatus described based on a common knowledge in a technical field of the present invention. In this regard, the transmission/reception sections 103 may be composed of an integrated transmission/reception section or may be composed of a transmission section and a reception section.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

Further, each transmission/reception section 103 receives UCI via the PUCCH from the shortened TTI (second TTI) configured by a smaller number of symbols than that of the normal TTI (first TTI). Furthermore, each transmission/reception section 103 receives a DMRS used to demodulate the UCI.

The baseband signal processing section 104 performs Fast Fourier Transform (FFT) processing, Inverse Discrete Fourier Transform (IDFT) processing, error correcting decoding, reception processing of MAC retransmission control, and reception processing of a RLC layer and a PDCP layer on user data included in the input uplink signal to transfer to the higher station apparatus 30 via the transmission path interface 106. The call processing section 105 performs call processing such as configuration and release of a communication channel, state management of the radio base station 10, and management of radio resources.

The transmission path interface 106 transmits and receives signals to and from the higher station apparatus 30 via a predetermined interface. Further, the transmission path interface 106 may transmit and receive (backhaul signaling) signals to and from the neighboring radio base station 10 via an inter-base station interface (e.g. optical fibers compliant with the CPRI (Common Public Radio Interface) or the X2 interface).

Figure 21:
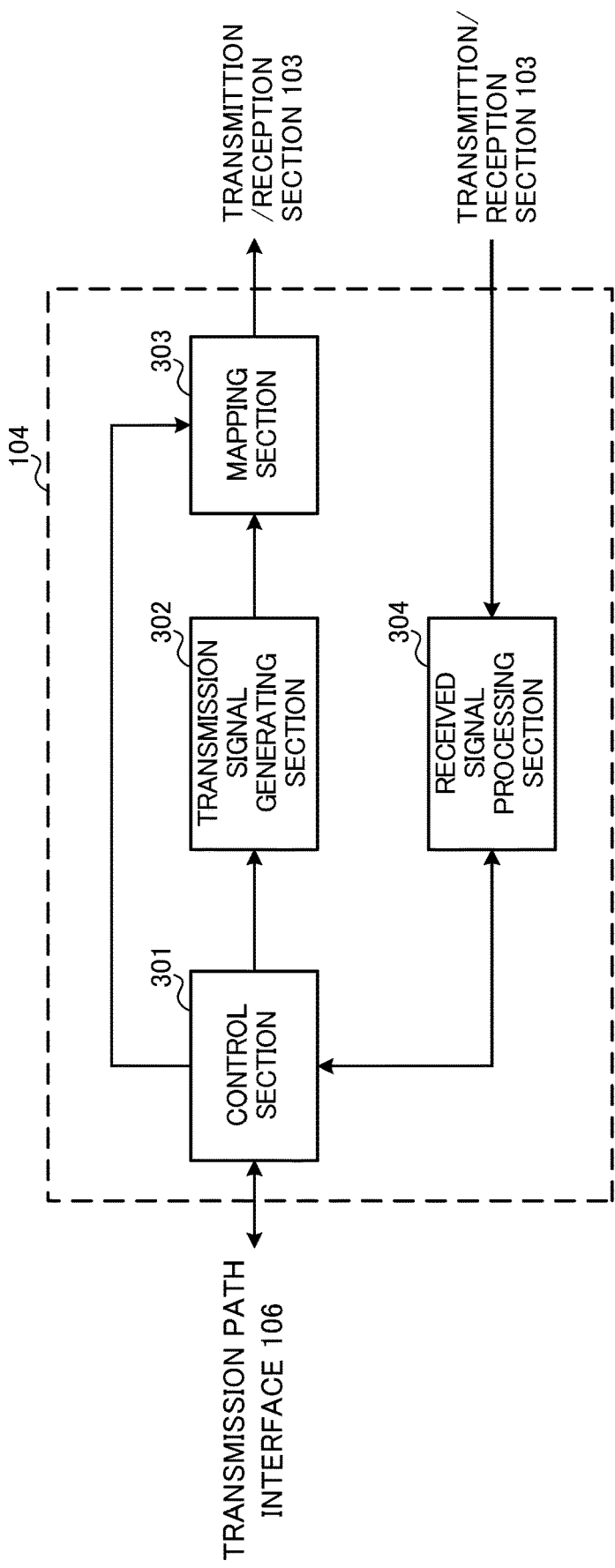
FIG. 21 is a diagram illustrating an example of a function configuration of the radio base station according to the present embodiment.

FIG. 21 is a diagram illustrating an example of a function configuration of the radio base station according to the present embodiment. In addition, FIG. 21 mainly illustrates function blocks of characteristic portions in the present embodiment, and it is assumed that the radio base station 10 has other function blocks required for radio communication, too. As shown in FIG. 21, the baseband signal processing section 104 includes the control section 301, a transmission signal generating section 302, a mapping section 303, and a received signal processing section 304.

The control section 301 controls the entire radio base station 10. The control section 301 controls, for example, generation of downlink signals in the transmission signal generating section 302, mapping of signals in the mapping section 303 and reception processing (e.g. demodulation) of uplink signals in the received signal processing section 304.

More specifically, the control section 301 performs transmission control (controls, for example, a modulation scheme, a code rate and resource allocation (scheduling)) on a downlink (DL) signal based on Channel State Information (CSI) reported from the user terminal 20.

Further, the control section 301 controls a Transmission Time Interval (TTI) used to receive a downlink signal and/or transmit an uplink signal. The control section 301 configures a normal TTI that is 1 ms and/or a shorter shortened TTI than the normal TTI. Arrangement examples and configuration examples of each shortened TTI are described with reference to FIGS. 2 and 3. The control section 301 may instruct the user terminal 20 to configure each shortened TTI by (1) explicit notification or explicit notification that is at least one of (2) RRC signaling, (3) MAC signaling and (4) PHY signaling.

More specifically, the control section 301 may configure each shortened TTI configured by the same number of symbols (e.g. seven symbols in the case of normal CP) as that of the normal slot or may configure each shortened TTI configured by a different number of symbols (e.g. four symbols or three symbols) from that of the normal slot. Further, the control section 301 may configure a plurality of shortened TTIs having the same number of symbols (e.g. seven or four symbols) in the normal TTI or may configure a plurality of shortened TTIs having a different number of symbols (e.g. a combination of seven, three and four symbols) in the normal TTI.

The control section 301 can be composed of a controller, a control circuit and a control apparatus described based on the common knowledge in the technical field according to the present invention.

The transmission signal generating section 302 generates downlink signals (including a downlink control signal and a downlink data signal) based on an instruction from the control section 301 to output to the mapping section 303. More specifically, the transmission signal generating section 302 generates a downlink data signal (PDSCH) including notification information (control information) and user data by the above higher layer signaling, and outputs the downlink data signal to the mapping section 303. Further, the transmission signal generating section 302 generates a downlink control signal (PDCCH/EPDCCH) including the above DCI, and outputs the downlink control signal to the mapping section 303. Furthermore, the transmission signal generating section 302 generates a downlink reference signal such as CRS and CSI-RS and outputs the downlink reference signal to the mapping section 303.

The transmission signal generating section 302 can be configured as a signal generator, a signal generation circuit and a signal generating apparatus described based on the common knowledge in the technical field according to the present invention.

The mapping section 303 maps the downlink signal generated by the transmission signal generating section 302, on predetermined radio resources based on the instruction from the control section 301, and outputs the downlink signal to the transmission/reception section 103. The mapping section 303 can be configured as a mapper, a mapping circuit or a mapping apparatus described based on the common knowledge in the technical field according to the present invention.

The received signal processing section 304 performs reception processing (e.g. demapping, demodulation and/or decoding) on an uplink signal transmitted from the user terminal 20. More specifically, the received signal processing section 304 demodulates UCI received via the PUCCH from each shortened TTI (or each shortened slot) by using a DMRS received from each shortened TTI (or each shortened slot). The received signal processing section 304 outputs a processing result to the control section 301.

The received signal processing section 304 can be composed of a signal processor, a signal processing circuit or a signal processing apparatus and a measurement instrument, a measurement circuit or a measurement apparatus described based on the common knowledge in the technical field according to the present invention.

<User Terminal>

Figure 22:
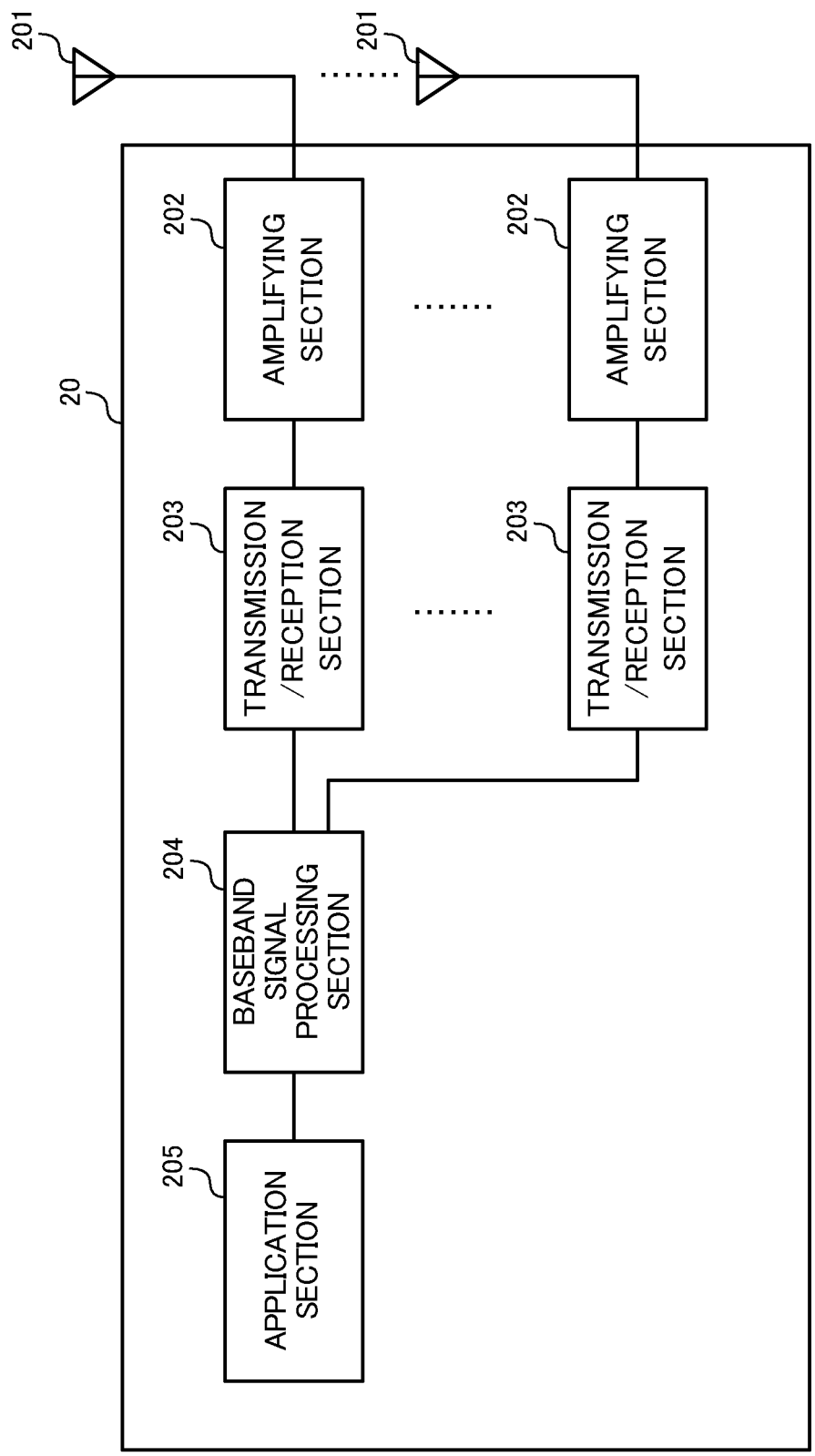
FIG. 22 is a diagram illustrating an example of an entire configuration of a user terminal according to the present embodiment.

FIG. 22 is a diagram illustrating an example of an entire configuration of the user terminal according to the present embodiment. The user terminal 20 includes a plurality of transmission/reception antennas 201 for MIMO transmission, amplifying sections 202, transmission/reception sections 203, a baseband signal processing section 204, and an application section 205.

Each amplifying section 202 amplifies radio frequency signals received at a plurality of transmission/reception antennas 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, reception processing of retransmission control and the like on the input baseband signal. The baseband signal processing section 204 transfers downlink data (user data) to the application section 205. The application section 205 performs processing related to layers higher than a physical layer and a MAC layer. Further, the baseband signal processing section 204 transfers broadcast information among the downlink data, too, to the application section 205.

Meanwhile, the application section 205 inputs uplink data to the baseband signal processing section 204. The baseband signal processing section 204 performs transmission processing of retransmission control (e.g. HARQ transmission processing), channel coding, rate matching, puncturing, Discrete Fourier Transform (DFT) processing, IFFT processing and the like on the uplink user data to transfer to each transmission/reception section 203. The baseband signal processing section 204 performs channel coding, rate matching, puncturing, DFT processing and IFFT processing on UCI, too, to transfer to each transmission/reception section 203.

Each transmission/reception section 203 converts the baseband signal output from the baseband signal processing section 204 into a signal of a radio frequency band to transmit. Each amplifying section 202 amplifies the radio frequency signal subjected to the frequency conversion by each transmission/reception section 203 to transmit from each transmission/reception antenna 201.

Further, each transmission/reception section 203 transmits the UCI via the PUCCH by using the shortened TTI (second TTI) configured by a smaller number of symbols than that of the normal TTI (first TTI). Furthermore, each transmission/reception section 203 transmits the DMRS used to demodulate the UCI.

The transmission/reception sections 203 can be configured as a transmitter/receiver, a transmission/reception circuit or a transmission/reception apparatus described based on the common knowledge in the technical field according to the present invention. Further, the transmission/reception sections 203 may be composed of an integrated transmission/reception section or may be composed of a transmission section and a reception section.

Figure 23:
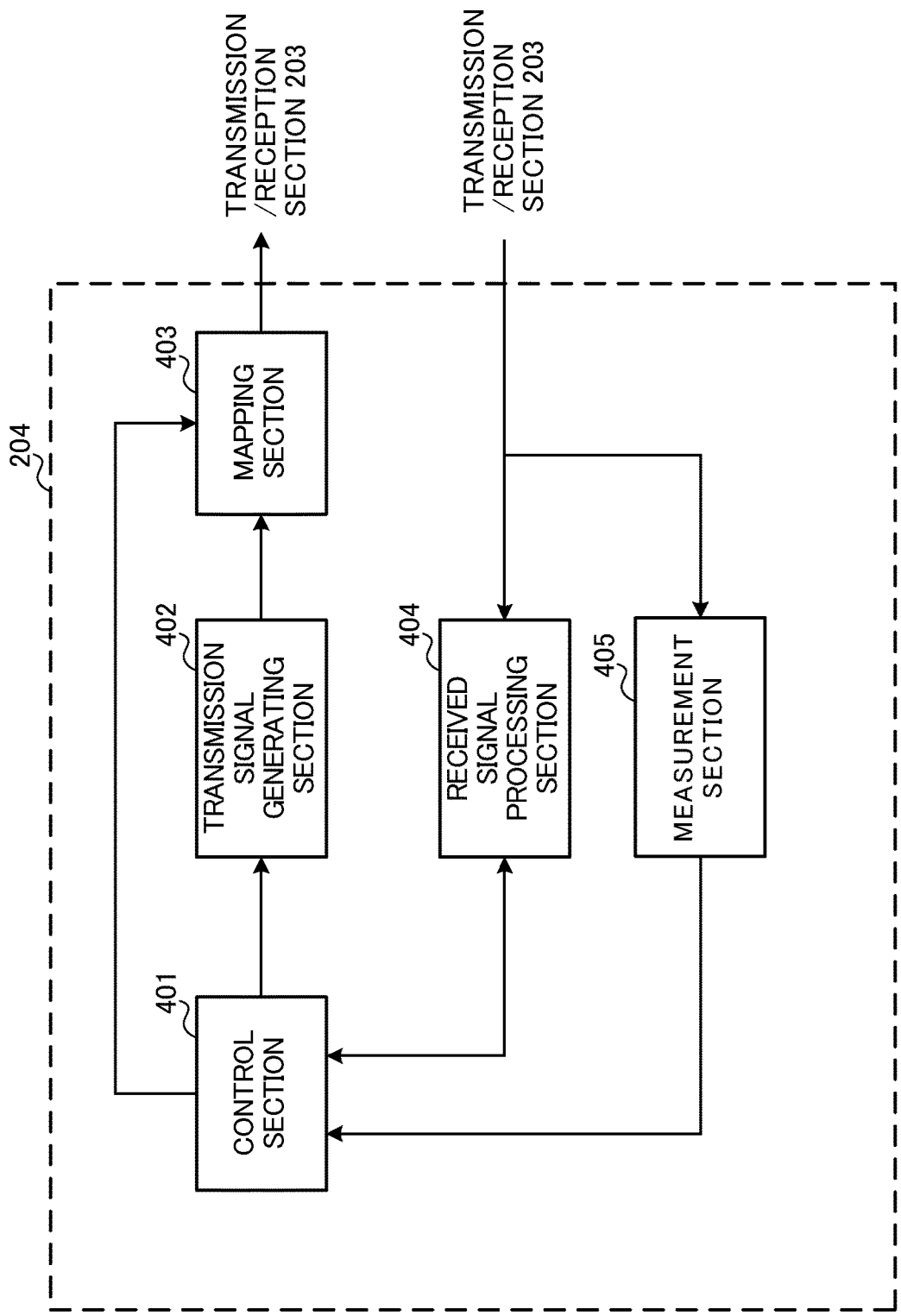
FIG. 23 is a diagram illustrating an example of a function configuration of the user terminal according to the present embodiment.

FIG. 23 is a diagram illustrating an example of a function configuration of the user terminal according to the present embodiment. In addition, FIG. 23 mainly illustrates function blocks of characteristic portions in the present embodiment, and it is assumed that the user terminal 20 has other function blocks required for radio communication, too. As shown in FIG. 23, the baseband signal processing section 204 of the user terminal 20 includes the control section 401, a transmission signal generating section 402, a mapping section 403, a received signal processing section 404, and a measurement section 405.

The control section 401 controls the entire user terminal 20. The control section 401 controls, for example, generation of signals in the transmission signal generating section 402, mapping of signals in the mapping section 403 and reception processing of signals in the received signal processing section 404.

Further, the control section 401 controls a Transmission Time Interval (TTI) used to receive a downlink (DL) signal and/or transmit an uplink (UL) signal. The control section 301 configures a normal TTI that is 1 ms and/or each shortened TTI shorter than the normal TTI. The arrangement examples and the configuration examples of each shortened TTI are as described with reference to FIGS. 2 and 3. The control section 401 may configure (detect) each shortened TTI by (1) explicit notification or explicit notification that is at least one of (2) RRC signaling, (3) MAC signaling and (4) PHY signaling from the radio base station 10.

More specifically, the control section 401 may configure each shortened TTI configured by the same number of symbols (e.g. seven symbols in the case of normal CP) as that of the normal slot or may configure each shortened TTI configured by a different number of symbols (e.g. four symbols or three symbols) from that of the normal slot. Further, the control section 401 may configure a plurality of shortened TTIs having the same number of symbols (e.g. seven or four symbols) in the normal TTI or may configure a plurality of shortened TTIs having a different number of symbols (e.g. a combination of seven, three and four symbols) in the normal TTI.

Furthermore, the control section 401 controls transmission of UCI by using the PUCCH in each shortened TTI configured as described above. More specifically, the control section 401 may perform control to cause the transmission signal generating section 402, the mapping section 403 and each transmission/reception section 203 to transmit the UCI by using a PRB subjected to frequency hopping between shortened slots in each shortened TTI, and map a DMRS on at least one symbol that configures the shortened slots (first embodiment). Further, the control section 401 may determine a PRB that is subjected to frequency hopping between the shortened slots in each shortened TTI, based on numbers of the shortened slots (first embodiment).

Furthermore, the control section 401 may perform control to cause the transmission signal generating section 402, the mapping section 403 and each transmission/reception section 203 to transmit the UCI of each shortened TTI by using part of the PUCCH formats (PFs 1/1a/1b/2/2a/2b/3/4/5) for the normal TTI, and map a DMRS on at least one symbol that configures each shortened TTI (second embodiment).

Still further, the control section 401 may apply orthogonal spreading (time and/or frequency spreading) that uses an orthogonal spreading code in each shortened TTI. More specifically, the control section 401 may apply time spreading that uses an orthogonal spreading code having an equal length to the number of a plurality of symbols, between a plurality of symbols on which UCI is mapped in each shortened slot (e.g. FIG. 10A). Further, the control section 401 may divide 12×M into N groups according to a PF (e.g. a new PF or the PF 4) that uses M (M≥1) or more PRBs, and apply frequency spreading by using an orthogonal spreading code of the sequence length N.

Furthermore, the control section 401 may apply phase rotation to each symbol in each shortened TTI. More specifically, the control section 401 may apply spreading (phase rotation) by Cyclic Shift (CS) between subcarriers of symbols on which UCI or a DMRS is mapped (e.g. FIG. 10B).

Further, when an identical symbol is shared by a plurality of shortened TTIs, the control section 401 may multiplex a DMRS of each of a plurality of shortened TTIs on the identical symbol by using Comb or cyclic shift (e.g. FIGS. 7B, 14A, 17B and 17C). Furthermore, when an identical symbol is shared by a plurality of shortened TTIs, the control section 401 may multiplex UCI of each of a plurality of shortened TTIs on the identical symbol by using Comb (e.g. FIGS. 14B and 17A).

Still further, the control section 401 may transmit the UCI by using a plurality of resource blocks per slot (e.g. FIGS. 8A, 8B, 16B, 17B and 18B).

Moreover, when transmitting a Sounding Reference Signal (SRS) by using a last symbol of the normal TTI, the control section 401 may apply a format from which the last symbol is removed, to each shortened TTI including the last symbol (e.g. FIGS. 9A and 9B).

Further, when (1) transmitting a PUCCH by using each shortened TTI by higher layer signaling and configuring a TTI length of each shortened TTI, the control section 401 may perform control to transmit the PUCCH by using each shortened TTI (use the PF according to the first or second embodiment) at all times (third embodiment).

Alternatively, when (2) transmitting a PUCCH by using each shortened TTI by higher layer signaling and configuring a TTI length of each shortened TTI, and scheduling the PDSCH by using each shortened TTI, the control section 401 may perform control to transit the PUCCH by using each shortened TTI (use the PF according to the first or second embodiment) (third embodiment).

Alternatively, when (3) transmitting a PUCCH by using each shortened TTI by higher layer signaling and configuring a TTI length of each shortened TTI, and detecting a L1/L2 control signal (e.g. PDCCH) for scheduling the PDSCH by using each shortened TTI, the control section 401 may perform control to transmit the PUCCH by using each shortened TTI (use the PF according to the first or second embodiment) (third embodiment).

The control section 401 can be composed of a controller, a control circuit or a control apparatus described based on the common knowledge in the technical field according to the present invention.

The transmission signal generating section 402 generates (e.g. coding, rate matching, puncturing and modulation) an uplink signal (including an uplink data signal and an uplink control signal) based on an instruction from the control section 401, and outputs the uplink signal to the mapping section 403.

More specifically, the transmission signal generating section 402 encodes the UCI, modulates the UCI by a predetermined modulation scheme (e.g. BPSK or QPSK) and spreads the UCI according to the instruction of the control section 401. Further, the transmission signal generating section 402 generates a DMRS used to demodulate (channel estimation) the UCI, spreads the DMRS according to the instruction of the control section 401 and outputs the DMRS to the mapping section 403. The transmission signal generating section 402 can be configured as a signal generator, a signal generation circuit and a signal generating apparatus described based on the common knowledge in the technical field according to the present invention.

The mapping section 403 maps UL signals (an uplink control signal and/or an uplink data signal) generated by the transmission signal generating section 402, on radio resources based on the instruction from the control section 401, and outputs the UL signal to the transmission/reception section 203. The mapping section 403 can be configured as a mapper, a mapping circuit or a mapping apparatus described based on the common knowledge in the technical field according to the present invention.

The received signal processing section 404 performs reception processing (e.g. demapping, demodulation and/or decoding) on a downlink signal (including a downlink control signal and a downlink data signal). The received signal processing section 404 outputs information received from the radio base station 10, to the control section 401. The received signal processing section 404 outputs, for example, broadcast information, system information, control information of higher layer signaling such as RRC signaling and DCI to the control section 401.

The received signal processing section 404 can be composed of a signal processor, a signal processing circuit or a signal processing apparatus described based on the common knowledge in the technical field according to the present invention. Further, the received signal processing section 404 can configure the reception section according to the present invention.

The measurement section 405 measures a channel state based on a reference signal (e.g. CSI-RS) from the radio base station 10, and outputs a measurement result to the control section 401. In this regard, the measurement section 405 may measure a channel state per CC.

The measurement section 405 can be composed of a signal processor, a signal processing circuit or a signal processing apparatus and a measurement instrument, a measurement circuit or a measurement apparatus described based on the common knowledge in the technical field according to the present invention.

<Hardware Configuration>

The block diagrams used to describe the embodiments illustrate blocks in function units. These function blocks (components) are realized by an arbitrary combination of hardware and/or software. Further, means for realizing each function block is not limited in particular. That is, each function block may be realized by one physically jointed apparatus or may be realized by a plurality of apparatuses formed by connecting two or more physically separate apparatuses by wires or by radio.

Figure 24:
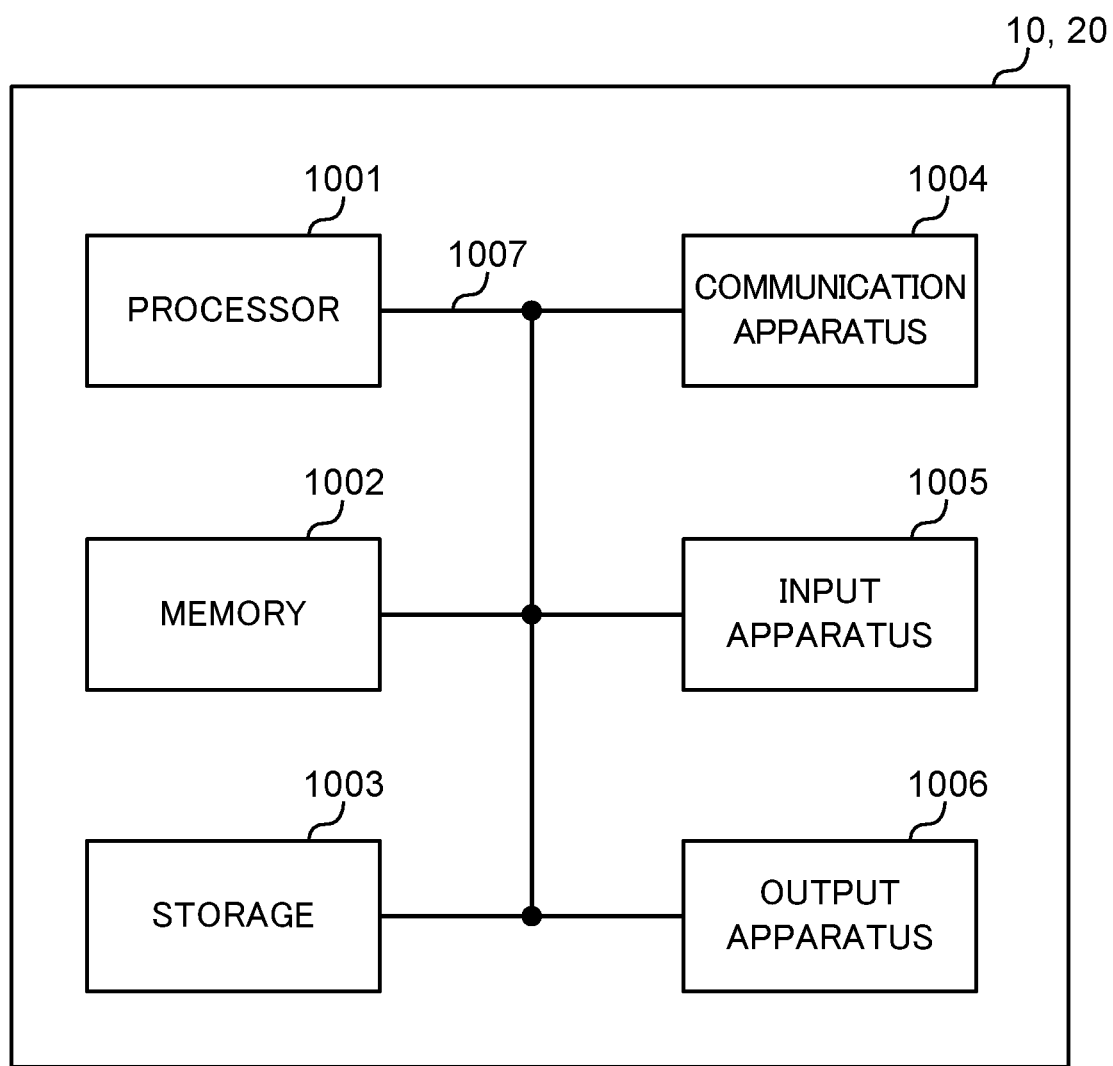
FIG. 24 is a diagram illustrating an example of hardware configurations of the radio base station and the user terminal according to one embodiment of the present invention.

For example, the radio base stations and the user terminal according to the present embodiment may function as a computer that performs processing of the radio communication method according to the present invention. FIG. 24 is a diagram illustrating an example of hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006, and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in the drawings or may be configured without including part of the apparatuses.

Each function of the radio base station 10 and the user terminal 20 is realized by causing hardware such as the processor 1001 and the memory 1002 to read predetermined software (program), and causing the processor 1001 to perform an arithmetic operation, and control communication in the communication apparatus 1004 and reading and/or writing of data in the memory 1002 and the storage 1003.

For example, the processor 1001 causes an operating system to operate and control the entire computer. The processor 1001 may be composed of a Central Processing Unit (CPU) including an interface for a peripheral apparatus, a control apparatus, an arithmetic apparatus and a register. For example, the baseband signal processing section 104 (204) and the call processing section 105 may be realized by the processor 1001.

Further, the processor 1001 reads programs (program codes), a software module or data from the storage 1003 and/or the communication apparatus 1004 out to the memory, and executes various types of processing according to the program, the software module or the data. Programs that cause a computer to execute at least part of the operations described in the above embodiments are used as the programs. For example, the control section 401 of the user terminal 20 may be realized by a control program stored in the memory 1002 and operated by the processor 1001 or other function blocks may be realized likewise, too.

The memory 1002 is a computer-readable recording medium and may be composed of at least one of, for example, a ROM (Read Only Memory), an EPROM (Erasable Programmable ROM) and a RAM (Random Access Memory). The memory 1002 may be referred to as a register, a cache or a main memory (main storage apparatus). The memory 1002 can store programs (program codes) and a software module that can be executed to carry out the radio communication method according to the present embodiment.

The storage 1003 is a computer-readable recording medium and may be composed of at least one of, for example, an optical disk such as a CD-ROM (Compact Disc ROM), a hard disk drive, a flexible disk, a magneto optical disk and a flash memory. The storage 1003 may be referred to as an auxiliary storage apparatus.

The communication apparatus 1004 is hardware (transmission/reception device) that performs communication between computers via a wired and/or radio network, and is, for example, a network device, a network controller, a network card, and a communication module. For example, the transmission/reception antennas 101 (201), the amplifying sections 102 (202), the transmission/reception sections 103 (203) and the transmission path interface 106 may be realized by the communication apparatus 1004.

The input apparatus 1005 is an input device (e.g. a keyboard or a mouse) that receives an input from an outside. The output apparatus 1006 is an output device (e.g. a display or a speaker) that sends an output to the outside. In addition, the input apparatus 1005 and the output apparatus 1006 may employ an integrated configuration (e.g. touch panel).

Further, each apparatus such as the processor 1001 or the memory 1002 is connected by the bus 1007 that communicates information. The bus 1007 may be composed of a single bus or may be composed of buses that are different between apparatuses.

Further, the radio base station 10 and the user terminal 20 may be configured to include hardware such as a microprocessor, an ASIC (Application Specific Integrated Circuit), a PLD (Programmable Logic Device) and a FPGA (Field Programmable Gate Array), and the hardware may realize part or all of each function block. For example, the processor 1001 may be mounted on at least one of these types of hardware.

In this regard, each term that is described in this description and/or each terminal that is necessary to understand this description may be replaced with terms having identical or similar meanings. For example, a channel and/or a symbol may be a signal (signaling). Further, a signal may be a message. Furthermore, a Component Carrier (CC) may be referred to as a cell, a frequency carrier and a carrier frequency.

Still further, a radio frame may be configured by one or a plurality of periods (frames) in a time domain. One or a plurality of periods (frames) that configures a radio frame may be referred to as a subframe. Further, the subframe may be configured by one or a plurality of slots in the time domain. Furthermore, the slot may be configured by one or a plurality of symbols (OFDM symbols or SC-FDMA symbols) in the time domain.

The radio frame, the subframe, the slot and the symbol indicate time units for transmitting signals. The other names corresponding to radio frame, the subframe, the slot and the symbol may be used. For example, one subframe may be referred to as a Transmission Time Interval (TTI), a plurality of continuous subframes may be referred to as TTIs or one slot may be referred to as a TTI. That is, the subframe or the TTI may be a subframe (1 ms) according to existing LTE, may be a period (e.g. 1 to 13 symbols) shorter than 1 ms or may be a period longer than 1 ms.

In this regard, the TTI refers to, for example, a minimum time unit for scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

Resource Blocks (RBs) are resource block allocation units of a time domain and a frequency domain, and may include one or a plurality of continuous subcarriers in the frequency domain. Further, the RB may include one or a plurality of symbols in the time domain or may be a length of one slot, one subframe or one TTI. One TTI or one subframe may be configured by one or a plurality of resource blocks. In this regard, the RB may be referred to as a Physical Resource Block (PRB: Physical RB), a PRB pair or a RB pair.

Further, the resource block may be configured by one or a plurality of Resource Elements (REs). For example, one RE may be a radio resource domain of one subcarrier and one symbol.

In this regard, structures of the radio frame, the subframe, the slot and the symbol are only exemplary structures. For example, configurations such as the number of subframes included in a radio frame, the number of slots included in a subframe, the numbers of symbols and RBs included in a slot, the number of subcarriers included in a RB, the number of symbols in a TTI, a symbol length and a Cyclic Prefix (CP) length can be variously changed.

Still further, the pieces of information and parameters described in this description may be expressed by absolute values, may be expressed by relative values of predetermined values or may be expressed by other pieces of corresponding information. For example, a radio resource may be instructed by a predetermined index.

The pieces of information and the signals described in this description may be expressed by using one of various different techniques. For example, the data, the instructions, the commands, the pieces of information, the signals, the bits, the symbols and the chips mentioned in the above entire description may be expressed as voltages, currents, electromagnetic waves, magnetic fields or magnetic particles, optical fields, photons or arbitrary combinations thereof.

Further, software, instructions and information may be transmitted and received via transmission media. When, for example, the software is transmitted from websites, servers or other remote sources by using wired techniques (e.g. coaxial cables, optical fiber cables, twisted pairs and Digital Subscriber Lines (DSL)) and/or radio techniques (e.g. infrared rays and microwaves), these wired techniques and/or radio technique are included in a definition of the transmission media.

Further, the radio base station in the description may be read as the user terminal. For example, each example/embodiment of the present invention may be applied to a configuration where communication between the radio base station and the user terminal is replaced with communication between a plurality of user terminals (D2D: Device-to-Device). In this case, the user terminal 20 may be configured to include the functions of the radio base station 10. Further, words such as "uplink" and "downlink" may be read as "sides". For example, the uplink channel may be read as a side channel.

Similarly, the user terminal in this description may be read as the radio base station. In this case, the radio base station 10 may be configured to include the functions of the user terminal 20.

Each example/embodiment described in this description may be used alone, may be used in combination or may be switched and used when carried out. Further, notification of predetermined information (e.g. notification of "being X") may be not only explicitly performed but also implicitly performed (by, for example, not notifying this predetermined information).

Notification of information is not limited to the example/embodiments described in this description and may be performed by other methods. For example, the notification of the information may be performed by physical layer signaling (e.g. DCI (Downlink Control Information) and UCI (Uplink Control Information)), higher layer signaling (e.g. RRC (Radio Resource Control) signaling, broadcast information (MIB (Master Information Block) and SIB (System Information Block)), and MAC (Medium Access Control) signaling), other signals and combinations thereof. Further, the RRC signaling may be referred to as a RRC message and may be, for example, a RRC Connection Setup message or a RRC Connection Reconfiguration message. Furthermore, MAC signaling may be notified by, for example, a MAC Control Element (MAC CE).

Each example/embodiment described in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other appropriate systems and/or next-generation systems that are enhanced based on these systems.

Orders of the processing procedures, the sequences and the flowchart of each example/embodiment described in this description may be rearranged unless contradictions arise. For example, the method described in this description presents various step elements in an exemplary order and is not limited to the presented specific order.

As described above, the present invention has been described in detail, yet it is obvious for a person skilled in the art that the present invention is not limited to the embodiments described in the description. For example, each of the above embodiments may be used alone or may be used in combination. The present invention can be carried out as modified and changed embodiments without departing from the subject matter and scope of the present invention defined by the description of the scope of the claims. Accordingly, the disclosure of the description is intended for illustrative explanation, and does not have any restrictive meaning to the present invention.

The present application is based on Japanese Patent Application No. 2016-013684 filed on Jan. 27, 2016, entire content of which is expressly incorporated by reference herein.

The invention claimed is:

1. A terminal comprising:
   a processor that determines a symbol location for mapping a demodulation reference signal based on:
      whether to apply intra-slot frequency hopping and
      on a format to apply to an uplink control channel using a second period that consists of a smaller number of symbols than a first period; and
   a transmitter that transmits the demodulation reference signal via the uplink control channel using the second period based on the determination of the symbol location.

2. The terminal according to claim 1, wherein when a first format is applied to the uplink control channel using the second period and the intra-slot frequency hopping is enabled, the processor maps the demodulation reference signal to a different symbol location in a first slot in a subframe from in a second slot in the subframe.

3. The terminal according to claim 2, wherein when the first format is applied to the uplink control channel using the second period and the intra-slot frequency hopping is enabled, the processor maps the demodulation reference signal to at least second and fifth symbol locations in the first slot and to at least second and sixth symbol locations in the second slot.

4. The terminal according to claim 1, wherein when the intra-slot frequency hopping is disabled, the processor maps the demodulation reference signal to a same symbol location in a first slot in a subframe as in a second slot in the subframe.

5. The terminal according to claim 4, wherein when a first format is applied to the uplink control channel using the second period and the intra-slot frequency hopping is disabled, the processor maps the demodulation reference signal to third, fourth and fifth symbol locations.

6. A radio communication method for a terminal, comprising:
   determining a symbol location for mapping a demodulation reference signal based on:
      whether to apply intra-slot frequency hopping and
      on a format to apply to an uplink control channel using a second period that consists of a smaller number of symbols than a first period; and
   transmitting the demodulation reference signal via the uplink control channel using the second period based on the determination of the symbol location.

7. The terminal according to claim 2, wherein when the intra-slot frequency hopping is disabled, the processor maps the demodulation reference signal to a same symbol location in a first slot in a subframe as in a second slot in the subframe.

8. A base station comprising:
   a processor that determines a symbol location, to which a demodulation reference signal is mapped, based on:
      whether to apply intra-slot frequency hopping and
      on a format to apply to an uplink control channel using a second period that consists of a smaller number of symbols than a first period; and
   a receiver that receives the demodulation reference signal via the uplink control channel using the second period based on the determination of the symbol location.

9. A system comprising a terminal and a base station, wherein:
   the terminal comprises:
      a processor that determines a symbol location for mapping a demodulation reference signal based on:
         whether to apply intra-slot frequency hopping and
         on a format to apply to an uplink control channel using a second period that consists of a smaller number of symbols than a first period; and
      a transmitter that transmits the demodulation reference signal via the uplink control channel using the second period based on the determination of the symbol location; and
   the base station comprises:
      a receiver that receives the demodulation reference signal via the uplink control channel using the second period based on the determination of the symbol location.

* * * * *